(12) United States Patent
Kirner et al.

(10) Patent No.: US 10,693,718 B2
(45) Date of Patent: *Jun. 23, 2020

(54) UPDATING MANAGEMENT INSTRUCTIONS FOR BOUND SERVICES IN A DISTRIBUTED NETWORK MANAGEMENT SYSTEM

(71) Applicant: Illumio, Inc., Sunnyvale, CA (US)

(72) Inventors: Paul J. Kirner, Palo Alto, CA (US); Juraj G. Fandli, Campbell, CA (US); Antonio P. A. Rainha Dias, Sunnyvale, CA (US)

(73) Assignee: Illumio, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/299,074

(22) Filed: Mar. 11, 2019

(65) Prior Publication Data

US 2019/0207815 A1 Jul. 4, 2019

Related U.S. Application Data

(63) Continuation of application No. 14/934,868, filed on Nov. 6, 2015, now Pat. No. 10,277,460.
(Continued)

(51) Int. Cl.
*H04L 12/24* (2006.01)

(52) U.S. Cl.
CPC ...... *H04L 41/0813* (2013.01); *H04L 41/0893* (2013.01); *H04L 41/5054* (2013.01); *H04L 41/5077* (2013.01)

(58) Field of Classification Search
CPC ............. H04L 41/0813; H04L 41/0893; H04L 41/5054; H04L 41/5077
See application file for complete search history.

(56) References Cited

U.S. PATENT DOCUMENTS 6,167,445 A 12/2000 Gai et al.
7,979,895 B2 7/2011 Farrell et al.
(Continued)

OTHER PUBLICATIONS

European Search Report for European Patent Application No. EP 16777009, dated Jan. 2, 2018, 9 Pages.
(Continued)

*Primary Examiner* — Azizul Choudhury
(74) *Attorney, Agent, or Firm* — Fenwick & West LLP

(57) ABSTRACT

Management instructions for a managed servers are updated according to a set of rules included in management policy. A global manager computer receives information describing a change in a bound service executed by the particular managed server. The global manager generates an updated description of the particular managed server is generated by modifying an initial description of the particular managed server according to the received information describing the change in the bound service. The global manager determines currently relevant rules for the particular managed server. If the currently-relevant rules differ from previously-relevant rules, the global manager determines a rule is that should be added. The global manager generates a function-level instruction including a reference to an authorized actor-set of actors permitted to communicate with the bound service. The global manager configures the particular managed server to enforce the function-level instruction.

20 Claims, 13 Drawing Sheets

Related U.S. Application Data

(60) Provisional application No. 62/143,419, filed on Apr. 6, 2015.

(56) References Cited

U.S. PATENT DOCUMENTS

| | | | |
|---|---|---|---|
| 8,429,649 | B1 | 4/2013 | Feathergill et al. |
| 8,819,561 | B2 | 8/2014 | Gupta et al. |
| 10,277,460 | B2 * | 4/2019 | Kirner ................. H04L 41/0813 |
| 2003/0018792 | A1 | 1/2003 | Shiouchi et al. |
| 2005/0102414 | A1 | 5/2005 | Hares et al. |
| 2006/0150240 | A1 | 7/2006 | Robinson et al. |
| 2009/0116396 | A1 | 5/2009 | Regan et al. |
| 2009/0254970 | A1 | 10/2009 | Agarwal et al. |
| 2011/0265168 | A1 | 10/2011 | Lucovsky et al. |
| 2013/0232193 | A1 | 9/2013 | Ali et al. |
| 2014/0052867 | A1 | 2/2014 | Lucovsky et al. |
| 2014/0304426 | A1 | 10/2014 | Eldar |
| 2014/0310408 | A1 | 10/2014 | Kirner et al. |
| 2014/0310415 | A1 | 10/2014 | Kirner et al. |
| 2014/0373091 | A1 | 12/2014 | Kirner et al. |
| 2015/0120962 | A1 | 4/2015 | Cai et al. |
| 2016/0294645 | A1 | 10/2016 | Kirner et al. |
| 2016/0294646 | A1 * | 10/2016 | Kirner ................. H04L 41/5054 |

OTHER PUBLICATIONS

International Search Report and Written Opinion for PCT/US16/17388, dated Jun. 24, 2016, 15 Pages.

United States Office Action, U.S. Appl. No. 14/934,868, dated Aug. 10, 2017, 12 pages.

United States Office Action, U.S. Appl. No. 14/934,868, dated Feb. 23, 2018, 11 pages.

* cited by examiner

UPDATING MANAGEMENT INSTRUCTIONS FOR BOUND SERVICES IN A DISTRIBUTED NETWORK MANAGEMENT SYSTEM

CROSS-REFERENCE TO RELATED APPLICATION

This application is a continuation of U.S. application Ser. No. 14/934,868, filed Nov. 6, 2015, now U.S. Pat. No. 10,277,460, which claims the benefit of U.S. Provisional Application No. 62/143,419, filed Apr. 6, 2015, each of which are incorporated by reference herein in their entirety.

BACKGROUND

1. Technical Field

The subject matter described herein generally relates to the field of managing servers (physical or virtual) of an administrative domain and, in particular, to managing bound services having different high-level characteristics than other services on a managed server.

2. Background Information

Servers (physical or virtual) of an administrative domain are managed according to a policy. For example, a security policy might specify access control and/or secure connectivity, while a resource-usage policy might specify usage of the administrative domain's computing resources (e.g., disks and/or peripherals). Conventional policies reference physical devices and are expressed in terms of low-level constructs such as Internet Protocol (IP) addresses, IP address ranges, subnetworks, and network interfaces. These low-level constructs make it difficult to write a fine-grained policy in an abstract and natural way. On the other hand, policies that apply blanket rules to all services on a device may not accommodate devices serving multiple functions in a network.

SUMMARY

The above and other issues are addressed by a method, non-transitory computer-readable storage medium, and system for generating management instructions for a particular managed server within an administrative domain according to an administrative domain-wide management policy that comprises a set of one or more rules. The administrative domain includes a plurality of managed servers. An embodiment of the method comprises the following steps. Information is received from a particular managed server. The information describes a change in a bound service executed by the particular managed server, where the bound service has different high-level characteristics from other services executed by the particular managed server. An updated description of the particular managed server is generated by modifying an initial description of the particular managed server according to the received information describing the change in the bound service. Currently relevant rules for the particular managed server are determined from the set of one or more rules based on the updated description. It is determined whether the currently relevant rules differ from previously relevant rules that were determined based on the initial description of the particular managed server. In response to determining that the currently-relevant rules differ from the previously-relevant rules: a rule is that should be added is determined, where the determined rule applicable to communication between the bound service and actors permitted to communicate with the bound service; a function-level instruction specifying the bound service and a reference to an authorized actor-set of the actors permitted to communicate with the bound service is generated based on the determined rule; and the function-level instruction is sent to the particular managed server to configure the particular managed server to enforce the function-level instruction.

An embodiment of the medium stores computer program modules executable by one or more processors to perform the following steps. Information is received from a particular managed server. The information describes a change in a bound service executed by the particular managed server, where the bound service has different high-level characteristics from other services executed by the particular managed server. An updated description of the particular managed server is generated by modifying an initial description of the particular managed server according to the received information describing the change in the bound service. Currently relevant rules for the particular managed server are determined from the set of one or more rules based on the updated description. It is determined whether the currently relevant rules differ from previously relevant rules that were determined based on the initial description of the particular managed server. In response to determining that the currently-relevant rules differ from the previously-relevant rules: a rule is that should be added is determined, where the determined rule applicable to communication between the bound service and actors permitted to communicate with the bound service; a function-level instruction specifying the bound service and a reference to an authorized actor-set of the actors permitted to communicate with the bound service is generated based on the determined rule; and the function-level instruction is sent to the particular managed server to configure the particular managed server to enforce the function-level instruction.

An embodiment of the system comprises one or more processors and a non-transitory computer-readable storage medium storing computer program modules executable by the one or more processors to perform the following steps. Information is received from a particular managed server. The information describes a change in a bound service executed by the particular managed server, where the bound service has different high-level characteristics from other services executed by the particular managed server. An updated description of the particular managed server is generated by modifying an initial description of the particular managed server according to the received information describing the change in the bound service. Currently relevant rules for the particular managed server are determined from the set of one or more rules based on the updated description. It is determined whether the currently relevant rules differ from previously relevant rules that were determined based on the initial description of the particular managed server. In response to determining that the currently-relevant rules differ from the previously-relevant rules: a rule is that should be added is determined, where the determined rule applicable to communication between the bound service and actors permitted to communicate with the bound service; a function-level instruction specifying the bound service and a reference to an authorized actor-set of the actors permitted to communicate with the bound service is generated based on the determined rule; and the function-level instruction is sent to the particular managed server to configure the particular managed server to enforce the function-level instruction.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
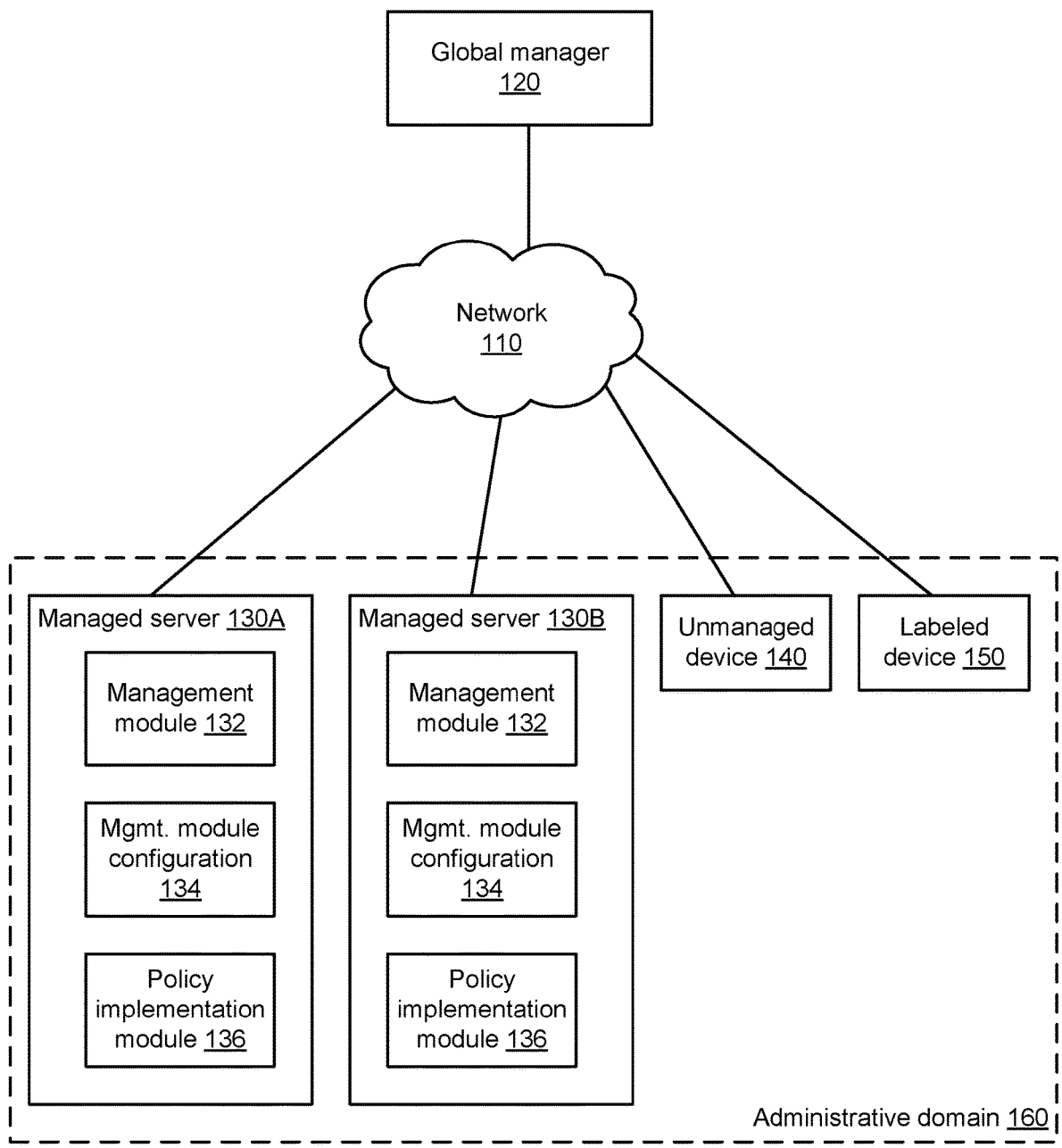
FIG. 1 is a high-level block diagram illustrating an environment for managing servers (physical or virtual) of an administrative domain, according to one embodiment.

FIG. 1 is a high-level block diagram illustrating an environment 100 for managing servers (physical or virtual) of an administrative domain 160, according to one embodiment. The administrative domain 160 can correspond to an enterprise such as, for example, a service provider, a corporation, a university, or a government agency. The environment 100 may be maintained by the enterprise itself or by a third party (e.g., a second enterprise) that helps the enterprise manage its servers 130. As shown, the environment 100 includes a network 110, a global manager 120, multiple managed servers 130, an unmanaged device 140, and a labeled device 150. The managed servers 130, the unmanaged device 140, and the labeled device 150 are associated with the administrative domain 160. For example, they are operated by the enterprise or by a third party (e.g., a public cloud service provider) on behalf of the enterprise. While one global manager 120, two managed servers 130, one unmanaged device 140, and one labeled device 150 are shown in the embodiment depicted in FIG. 1 for clarity, other embodiments can have different numbers of global managers 120, managed servers 130, unmanaged devices 140, and/or labeled devices 150.

The network 110 represents the communication pathway between the global manager 120, the managed servers 130, and the unmanaged devices 140. In one embodiment, the network 110 uses standard communications technologies and/or protocols and can include the Internet. In another embodiment, the entities on the network 110 can use custom and/or dedicated data communications technologies.

Figure 3A:
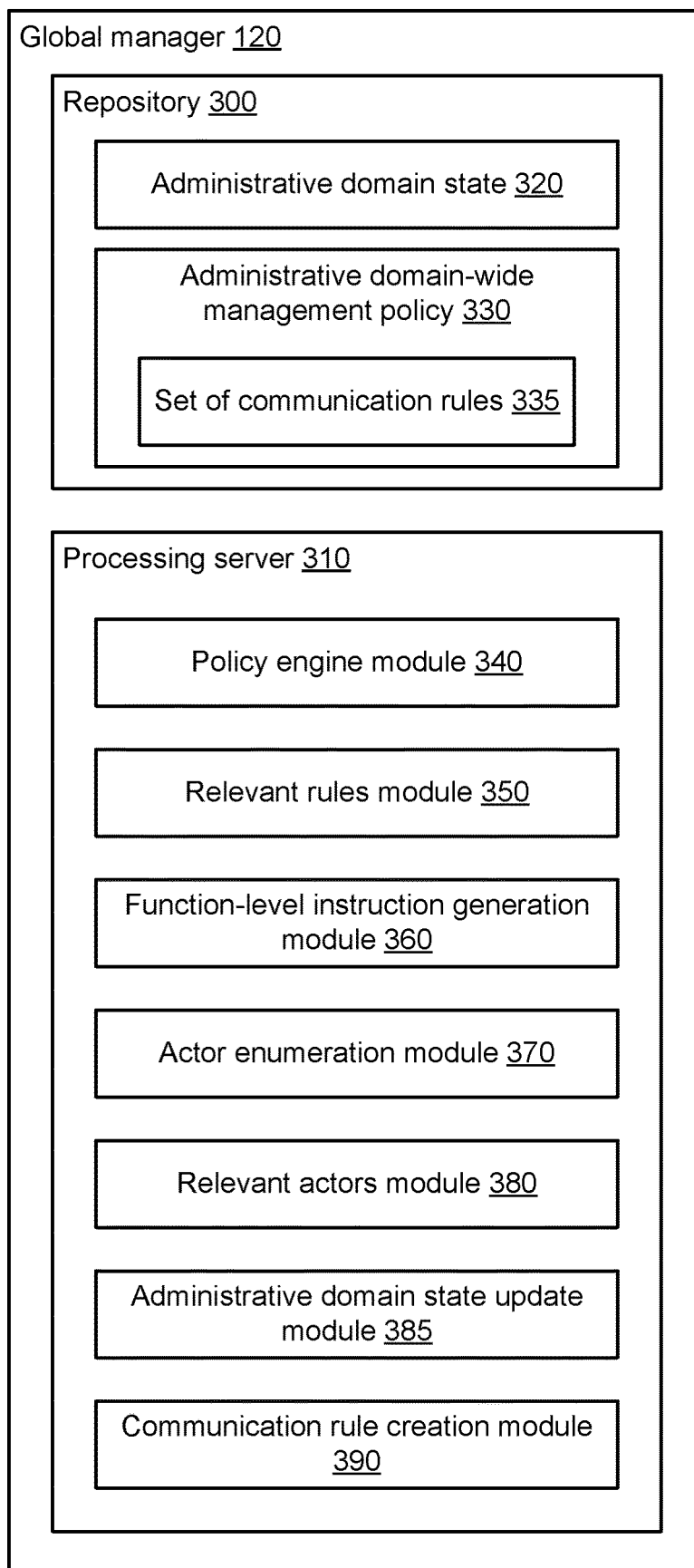
FIG. 3A is a high-level block diagram illustrating a detailed view of a global manager, according to one embodiment.

A managed server 130 is a machine (physical or virtual) that implements an administrative domain-wide management policy 330 (shown in FIG. 3A). In one embodiment, a server is a user-space instance of a virtual server (sometimes referred to as a container, virtualization engine, virtual private server, or jail) according to operating system-level virtualization, which is a server virtualization method where the kernel of an operating system enables multiple isolated user-space instances, instead of only one instance. If a managed server 130 is a physical machine, then the managed server 130 is a computer or set of computers. If a managed server 130 is a virtual machine, then the managed server 130 executes on a computer or set of computers. The administrative domain-wide management policy 330 specifies whether and/or how entities associated with the administrative domain 160 are allowed to access (or be accessed by) other entities or otherwise consume (or provide) services. For example, the administrative domain-wide management policy 330 specifies security or resource usage. A security policy might specify access control, secure connectivity, disk encryption, and/or control of executable processes, while a resource-usage policy might specify usage of the administrative domain's computing resources (e.g., disks, peripherals, and/or bandwidth).

A managed server 130 includes a management module 132, a management module configuration 134, and a policy implementation module 136. The management module 132 implements the administrative domain-wide management policy 330. For example, in the case of security, the management module 132 can be a low-level network or security engine such as an operating system-level firewall, an Internet Protocol security (IPsec) engine, or a network traffic filtering engine (e.g., based on the Windows Filtering Platform (WFP) development platform). In the case of resource usage, the management module 132 can be a disk-usage engine or a peripheral-usage engine.

The management module configuration 134 affects the operation of the management module 132. For example, in the case of security, the management module configuration 134 can be access control rules applied by a firewall, secure connectivity policies applied by an IPsec engine (e.g., embodied as iptables entries and ipset entries in the Linux operating system), or filtering rules applied by a filtering engine. In the case of resource usage, the management module configuration 134 can be disk-usage policies applied by a disk-usage engine or peripheral-usage policies applied by a peripheral-usage engine.

The policy implementation module 136 generates the management module configuration 134 based on a) management instructions received from the global manager 120 and b) the state of the managed server 130. The management instructions are generated based, in part, on the administrative domain-wide management policy 330. The management module configuration 134 generated by the policy implementation module 136 implements that administrative domain-wide management policy 330 (to the extent that the policy concerns the managed server 130). This two-step process (generating management instructions and generating the management module configuration 134) is referred to as "instantiating" a management policy. The policy implementation module 136 also monitors the local state of the managed server 130 and sends local state information to the global manager 120.

In one embodiment, the policy implementation module 136 is part of a larger proprietary module (not shown). The proprietary module is loaded onto a device (or virtual device) that already has a management module 132 and a management module configuration 134, thereby transforming the device (or virtual device) from an unmanaged device 140 or labeled device 150 to a managed server 130. The policy implementation module 136 is further described below with reference to FIGS. 4, 6, and 7.

The global manager 120 is a computer (or set of computers) that generates management instructions for managed servers 130 and sends the generated management instructions to the servers. The management instructions are generated based on a) the state of the administrative domain's computer network infrastructure (the "administrative domain state 320") and b) an administrative domain-wide management policy 330. The administrative domain state 320 includes descriptions of managed servers 130 and (optionally) descriptions of unmanaged devices 140 or labeled devices 150. The global manager 120 also processes local state information received from managed servers 130.

The administrative domain-wide management policy 330 is based on a logical management model that can reference managed servers 130 based on their high-level characteristics, referred to herein as "labels." A label is a pair that includes a "dimension" (a high-level characteristic) and a "value" (the value of that high-level characteristic). A management policy constructed in this multi-dimensional space is more expressive than a management policy constructed according to a single-characteristic network/IP address-based policy model. In particular, expressing management policy using the higher-level abstractions of "labels" enables people to better understand, visualize, and modify management policy.

The logical management model (e.g., the number and types of dimensions available and those dimensions' possible values) is configurable. In one embodiment, the logical management model includes the following dimensions and values, as shown in Table 1:

TABLE 1

Example of logical management model

| Dimension | Meaning (M), Values (V) |
|---|---|
| Role | M: The role of the managed server within the administrative domain. <br> V: web, API, database |
| Environment | M: The lifecycle stage of the managed server. <br> V: production, staging, development |

TABLE 1-continued

Example of logical management model

| Dimension | Meaning (M), Values (V) |
|---|---|
| Application | M: The logical application (higher-level grouping of managed servers) to which the managed server belongs. <br> V: trading, human resources |
| Line of Business | M: The business unit to which the managed server belongs. <br> V: marketing, engineering |
| Location | M: The location of the managed server. Can be physical (e.g., country or geographical region) or logical (e.g., network). Physical is particularly useful for expressing geographic compliance requirements. <br> V: US or EU (physical), us-west-1 or us-east-2 (logical) |

The logical management model enables multiple managed servers 130 to be grouped together by specifying one or more labels (referred to herein as a "label set") that describe all of the managed servers 130 in the group. A label set includes either zero values or one value for a dimension in the logical management model. A label set need not include labels for all dimensions in the logical management model. In this way, the logical management model enables the segmentation and separation of an administrative domain's managed servers 130 and the creation of arbitrary groupings of managed servers 130. The logical management model also allows for a single managed server 130 to exist in multiple overlapping sets (i.e., multiple overlapping groups of managed servers). The logical management model does not limit the single managed server 130 to existing in a hierarchy of nested sets.

For example, in the case of security, segmentation can be used with access control policies to define groups of managed servers 130 that are subject to particular policies. Similarly, segmentation can be used with secure connectivity policies to define groups of managed servers 130 and the policies that apply to intra-group communications and inter-group communications. So, communications among a first group of managed servers 130 (specified by a first label set) can be restricted to a first secure connection setting (e.g., secure connection not required), and communications between the first group of managed servers and a second group of managed servers (specified by a second label set) can be restricted to a second secure connection setting (e.g., IPsec Encapsulating Security Payload (ESP)/Authentication Header (AH) Advanced Encryption Standard (AES)/Secure Hash Algorithm-2 (SHA-2)).

Each managed server 130 in the environment 100 implements the administrative domain-wide management policy 330 (to the extent that the policy concerns the managed server 130). As a result, the administrative domain-wide management policy 330 is applied in a distributed fashion throughout the administrative domain 160, and there are no choke points. Also, the administrative domain-wide management policy 330 is applied at the logical level independent of the administrative domain's physical network topology and network addressing schemes.

An unmanaged device 140 is a computer (or set of computers) that does not include a policy implementation module 136. An unmanaged device 140 does not implement the administrative domain-wide management policy 330. However, interaction between a managed server 130 and an unmanaged device 140 can be subject to the administrative domain-wide management policy 330 (as implemented by the managed server 130). One example of an unmanaged device 140 is a network circuit that is used by an administrative domain 160. Another example of an unmanaged device 140 is a device used by a person to authenticate himself to the administrative domain 160 (e.g., a notebook or desktop computer, a tablet computer, or a mobile phone).

A labeled device 150 is an unmanaged device 140 that the administrative domain-wide management policy 330 refers to by one or more labels ("a label set"). Since label sets refer to high-level characteristics of the labeled device 150, label sets facilitate application of policies controlling communication between a labeled device 150 and a managed server 130. When the global manager 120 labels an unmanaged device 140, the device becomes a labeled device 150. Like unmanaged devices 140 that are unlabeled, labeled devices 150 may be servers, client devices, or other computers, and may be physical computers or virtual computers.

The administrative domain-wide management policy 330 includes rules regulating actors within the administrative domain 160. The administrative domain-wide management policy 330 may include rules specifying particular unmanaged devices 140 (identified by their respective network addresses, for instance). However, if an additional unmanaged device 140 joins the administrative domain 160, the rules specifying the particular unmanaged devices 140 do not apply to the additional unmanaged device 140 even if the additional unmanaged device 140 is similar to those unmanaged devices 140 specified by the rule. To cover the additional unmanaged device 140, the global manager 120 modifies the rule to further specify the additional unmanaged device 140. Other rules specify label sets for improved generality and to facilitate intuitive review by an administrator. Such a rule applies to an additional labeled device 150 introduced to the administrative domain 160 without modification of the rule. Accordingly, labeled devices 150 facilitate specification of rules using label sets. Such rules are less computationally complex to maintain, so associating an unmanaged device 140 with a label set (thereby transforming it into a labeled device 150) beneficially facilitates management of the administrative domain 160.

Some managed servers 130 provide bound services that perform different functionality than other services on a managed server 130. A bound service is described by a different label set than the label set of the managed server 130 that provides the bound service. Accordingly, the global manager 120 associates the bound services with label sets that are independent of their host managed server's label set. When applying rules to a managed server 130, the global manager 120 handles a bound service on the managed server 130 as an independent actor from the managed server 130. In some embodiments, the global manager 120 handles each service on a managed server 130 as a separate actor. However, such an embodiment may introduce duplicate actors representing services with matching label sets.

In some embodiments, the global manager 120 groups services to reduce the number of actors to manage in the administrative domain 160. The global manager 120 processes services on a managed server 130 that are not bound services (i.e. that are accurately described by the managed server's label set) as a single actor. The global manager 120 also groups those bound services on a managed server 130 that have matching label sets into a "bound service group," which functions as an independent actor associated with the managed server 130. Accordingly, the global manager 120 determines that a rule is relevant to a managed server 130 if the rule is relevant to one or more of the managed server's actors (e.g., the actor representing non-bound services on the managed server 130 or any actors representing bound service groups on the managed server 130).

Some bound services are executed by a plurality of managed servers 130. Such a bound service is referred to as a "distributed bound service." Instances of a distributed bound service executing on different managed servers 130 are associated with the same label set regardless of the respective label sets of the managed servers 130 executing the instances of the distributed bound service. Since a distributed bound service is provided by multiple managed servers 130, the distributed bound service is part of a bound service group on each managed server 130.

In some embodiments, the global manager 120 maintains a list of bound services. An entry for a bound service indicates the label set of the bound service and the one or more managed servers 130 providing the bound service. The list entry for a bound service may also indicate identifiers of one more bound service groups containing the bound service. For example, the list entry for a distributed bound service indicates the label set for the distributed bound service, identifiers of the multiple managed servers 130 executing the distributed bound service, and the identifiers of bound service groups containing the distributed bound service on each of the multiple managed servers 130.

In some embodiments, an administrator provides the global manager 120 with the list of bound services and updates the list of bound services. Alternatively or additionally, the global manager 120 provides mechanisms for identifying bound services. For example, the global manager 120 identifies bound services by analyzing properties of services on managed servers 130 such as whether the service is associated with a binding that overrides the port conventionally assigned to a process used by the service. The global manager 120 also obtains labels for bound services according to an analysis of the properties of the bound services (or properties of communications attributable to the bound services), according to input provided by an administrator, or according to a combination thereof.

The global manager 120, the administrative domain state 320, and the administrative domain-wide management policy 330 are further described below with reference to FIGS. 3A, 3B, 5, and 8-11.

Computer

Figure 2:
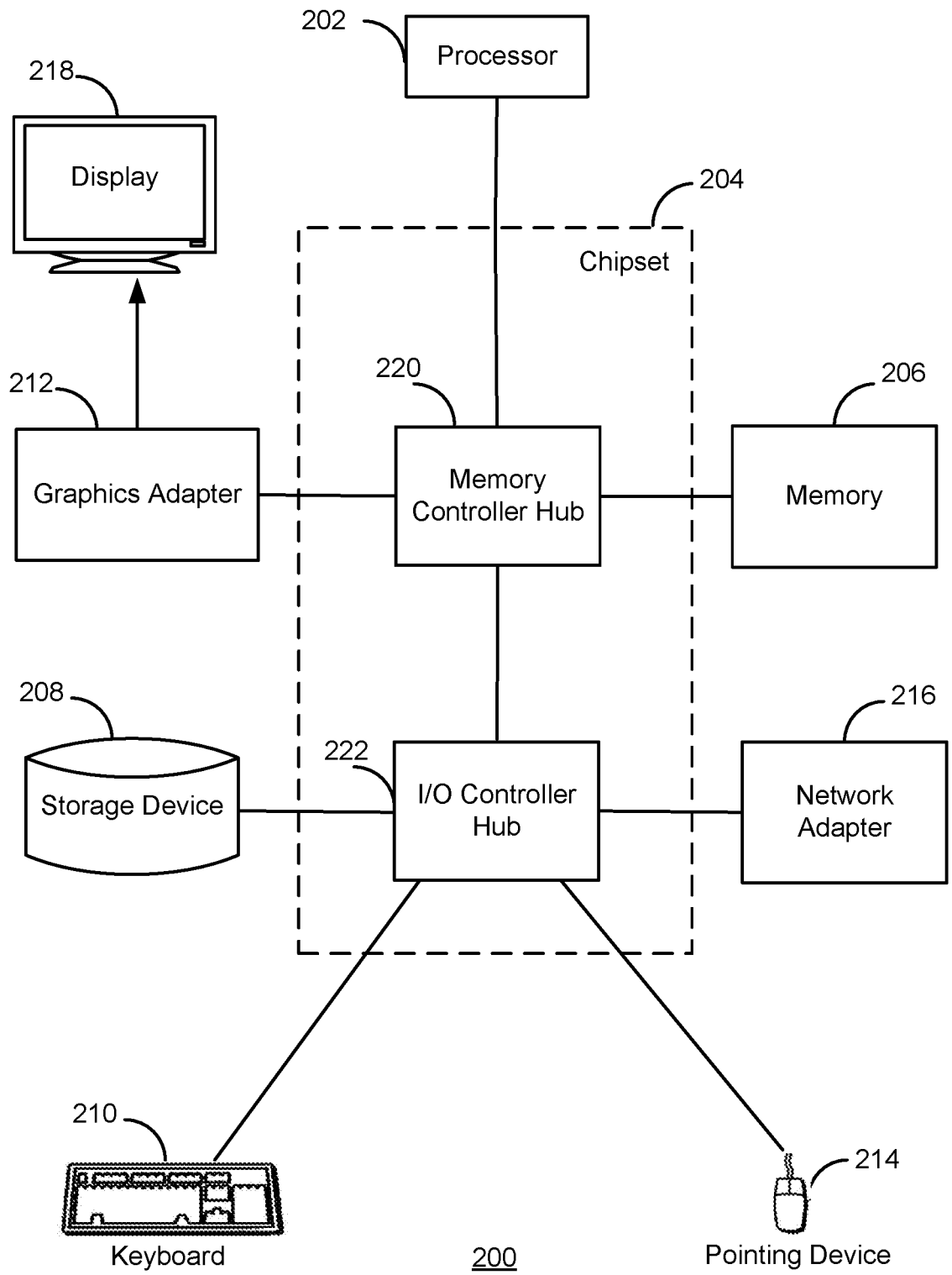
FIG. 2 is a high-level block diagram illustrating an example of a computer for use as one or more of the entities illustrated in FIG. 1, according to one embodiment.

FIG. 2 is a high-level block diagram illustrating an example of a computer 200 for use as one or more of the entities illustrated in FIG. 1, according to one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the global manager 120 and/or the managed server 130 can be formed of multiple blade servers and lack a display device, keyboard, and other components, while an unmanaged device 140 or a labeled device 150 can be a notebook or desktop computer, a tablet computer, or a mobile phone.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Global Manager

FIG. 3A is a high-level block diagram illustrating a detailed view of a global manager 120, according to one embodiment. The global manager 120 includes a repository 300 and a processing server 310. The repository 300 is a computer (or set of computers) that stores the administrative domain state 320 and the administrative domain-wide management policy 330. In one embodiment, the repository 300 includes a server that provides the processing server 310 access to the administrative domain state 320 and the management policy 330 in response to requests.

Administrative Domain State

The administrative domain state 320 includes descriptions of managed servers 130 and (optionally) descriptions of other network devices including unmanaged devices 140, and/or labeled devices 150. A description of a managed server 130 includes, for example, a unique identifier (UID), an online/offline indicator, one or more configured characteristics (optional), network exposure information, service information, and one or more labels that describe the managed server 130 (a label set).

The UID uniquely identifies the managed server 130. The online/offline indicator indicates whether the managed server 130 is online or offline. A "configured characteristic" stores a value associated with the managed server 130 and can be any type of information (e.g., an indication of which operating system is running on the managed server). A configured characteristic is used in conjunction with a rule's condition portion (described below).

The network exposure information concerns the managed server's network interfaces. A network interface refers to the hardware, software, of both that a device (e.g., managed server 130) uses to exchange information with the network 110 or other devices in the administrative domain 160. In one embodiment, the network exposure information includes, for each of the managed server's network interfaces, an identifier of a "bidirectionally-reachable network" (BRN) to which the network interface is attached and zero or more IP addresses (and their subnets) that are used for operating within the BRN. A BRN is a set of subnets, within an organization or across organizations, where any node within the BRN can establish communication with any other node in the BRN. For example, all of the nodes in a BRN have unique IP addresses. In other words, a BRN does not contain any NATs. Network exposure information (e.g., a network interface's BRN identifier) can be used in conjunction with a rule's condition portion.

In another embodiment, the network exposure information includes routing information and/or whether the managed server is behind a network address translator (NAT) (and, if it is behind a NAT, what type of NAT—1:1 or 1:N). The global manager 120 can determine whether a managed server 130 is behind a network address translator (NAT) (and, if it is behind a NAT, what type of NAT—1:1 or 1:N). For example, the global manager 120 determines whether a NAT exists between the global manager 120 and the managed server 130 by comparing (a) the server's IP address according to the TCP connection between the global manager 120 and the server and (b) the server's IP address according to the local state information received from the server. If (a) and (b) differ, then a NAT exists between the global manager 120 and the managed server 130. If a NAT does exist, then the global manager 120 determines the type of NAT (1:1 or 1:N) by performing data center detection. For example, the global manager 120 identifies the server's data center by the data center's public IP address. (Alternatively, the managed server performs data center detection by querying information that is external to the server but inside the data center. The server then sends that information to the global manager 120 as part of the local status.) Configuration information indicates which types of NATs are used by which data centers. If no NAT information is associated with a particular data center, then the global manager 120 assumes that the NAT type is 1:N.

The description of a managed server 130 also includes service information describing services on a managed server 130 as well as bound services on a managed server 130. The service information includes, for example, process information and/or package information. Process information includes, for example, names of processes that the managed server 130 is running, which network ports and network interfaces those processes are listening on, which users initiated those processes, configurations of those processes, command-line launch arguments of those processes, and dependencies of those processes (e.g., shared objects to which those processes link). (Those processes correspond to the managed server 130 providing a service or using a service.) Package information includes, for example, which packages (executables, libraries, or other components) are installed on the managed server 130, the versions of those packages, the configurations of those packages, and the hash values of those packages. If a managed server 130 provides any bound services, the managed server's description may identify the bound services, bound service groups organizing one or more similar bound services, label sets corresponding to each bound service group, and a pointer to the bound service group, such as a unique identifier (UID).

A description of an unmanaged device 140 includes, for example, network exposure information (e.g., the IP address of the unmanaged device 140 and an identifier of the BRN to which the unmanaged device 140 is connected) or a unique identifier (UID). An unmanaged device 140 is part of an "unmanaged device group" (UDG). A UDG includes one or more unmanaged devices 140. For example, the "Headquarters UDG" could include the primary circuit and the backup circuit that are used by an administrative domain's headquarters, where each circuit is associated with an IP address. A UDG is associated with a unique identifier (UID). Information stored in the administrative domain state 320 regarding a UDG includes the UID of the UDG and information regarding the unmanaged devices 140 in the UDG (e.g., their network exposure information).

Like the description of other unmanaged devices 140, the description of a labeled device 150 may include network exposure information, a UID of the labeled device 150, and/or one or more UDGs including the labeled device 150.

Similar to a managed server 130, the description of a labeled device 150 includes a label set describing the high-level characteristics of the labeled device 150. The description of a labeled device 150 may include a flag or other field indicating that the labeled device 150 lacks a policy implementation module 136 (or equivalently whether the labeled device 150 is a managed server 130). The description of a labeled device 150 may also include configured characteristics indicating additional labeled device information that is externally visible to the global manager 120 or a managed server 130. For example, even though a labeled device 150 lacks a policy implementation module 136, a managed server 130 might determine the operating system of the labeled device 150 based on the labeled device's response to valid and invalid requests (e.g., valid and invalid transmission control protocol (TCP) packets). As another example, a managed server 130 determines whether a labeled device 150 is online or offline by determining if the labeled device 150 responds to requests (e.g., ping requests).

Descriptions of managed servers 130, unmanaged devices 140, and labeled devices 150 can be loaded into the administrative domain state 320 in various ways, such as by interacting with the global manager 120 via a graphical user interface (GUI) or an application programming interface (API). Descriptions of managed servers 130 can also be loaded into the administrative domain state 320 based on local status information received from managed servers (described below).

Regarding labels, the global manage 120 may assign (or reassign) a value to a label dimension in many ways. For example, the assignment/setting can be performed using a deployment and configuration tool as part of provisioning a managed server 130. Any such tool can be used, including off-the-shelf third-party tools (e.g., Puppet Labs' Puppet software, Opscode's Chef software, or CFEngine AS' CFEngine software) and custom tools that an administrative domain 160 might have. Assignment of labels is described in further detail with respect to FIG. 9.

As another example, the assignment/setting can be performed by a "label/configured characteristic engine" (not shown) that determines labels and/or configured characteristic ("CC") values. In one embodiment, the label/CC engine calculates labels/CC values based on label/CC assignment rules. A label/CC assignment rule is a function that accesses data from the administrative domain state 320 and assigns (or suggests assignment of) a label or a CC value. A label/CC assignment rule can be preset or user-configurable. For example, the global manager 120 includes a set of pre-defined rules, but the end-user can modify and/or delete those rules and add new rules based on the user's own custom requirements. Label/CC assignment rules can be evaluated for a managed server 130 during the initialization process. Label/CC value suggestions can then be made for any dimension/CC, and the end-user can accept or reject those suggestions. For example, if a managed server 130 is executing the Postgres database or the MySQL database, then the suggested label could be <Role, Database>. If a managed server is executing the Linux operating system, then the suggested value for the operating system CC could be "Linux." In some embodiments, separate modules provide the assignment of labels and configured characteristics, respectively. For example, a module to assign labels is described below in further detail in conjunction with FIG. 9.

In another embodiment, the label/CC engine calculates labels/CC values based on cluster analysis. For example, the label/CC engine uses a combination of min-cut and K-means algorithms, with additional heuristics, of connected graphs to automatically identify a cluster of highly-connected managed servers 130, bound services, and/or labeled devices 150. The cluster of managed servers 130 and/or labeled devices 150 might correspond to an "application" (see Table 1) in the administrative domain 160. The end-user can choose to apply a value for the Application dimension (or any other dimension) to those managed servers 130, bound service groups, and/or labeled devices 150 en masse.

Administrative Domain-Wide Management Policy

The administrative domain-wide management policy 330 includes one or more rules. Broadly speaking, a "rule" specifies a relationship between one or more providers of a service and one or more consumers of that service. The administrative domain-wide management policy 330 includes a set of access control rules 335, which is described below in the section entitled "Communication Rules."

Rule Function—The relationship is subjected to a "rule function", which is the practical effect of the rule. For example, in the case of security, the rule function could be access control, secure connectivity, disk encryption, or control of executable processes. A rule with an access control function specifies whether a consumer may use a provider's service. In one embodiment, the access control function uses a pure "whitelist" model, which means that only the allowable relationships are expressed, and all other relationships are blocked by default. A rule with a secure connectivity function specifies over what secure channels (e.g., encrypted network sessions using point-to-point data encryption) a consumer may use a provider's service. For example, a rule with a secure connectivity function could specify that usage of a provider's services must be encrypted when the provider is located in the US and the consumer is located in the EU. A rule with a disk encryption function specifies whether a provider must store its data on an encrypted file system. A rule with an executable process-control function specifies whether a process is allowed to execute.

In the case of resource usage, the rule function could be disk-usage or peripheral-usage. A rule with a disk-usage function specifies an amount of data that a consumer can store on a provider. Note that a rule can specify other rule functions as well beyond just access control, secure connectivity, disk encryption, control of executable processes, disk usage, and peripheral usage. For example, a rule function could specify which Open Systems Interconnection (OSI) model Layer-7 services to apply to network traffic, the amount of metadata to collect for security analytics, or the triggers for capturing a complete network packet. The management policy model supports any number of rule functions that can be applied.

A rule function can be associated with one or more settings (referred to herein as a "function profile") that specify details regarding the practical effect of the rule. For example, settings associated with a secure connectivity rule function can be a list of cryptographic algorithms used to encrypt network traffic. In one embodiment, a rule function is associated with multiple function profiles, and a function profile includes a priority. This priority is used by the function-level instruction generation module 360, as described below.

Service—In general, a "service" is an arbitrary process executing on a specific network port using a specific network protocol. A service of a rule within the management policy 330 is specified by a port/protocol pair and (optionally) additional qualifications, such as process information and/or package information (described above with respect to a description of a managed server 130 within the administrative domain state 320). If a managed server 130 has multiple network interfaces, then a service can be exposed on all networks or on only a subset of those networks. The end-user specifies on which networks the service is exposed. Note that, depending on the rule function, a service might not use any network resources. For example, a service for an executable process-control rule function does not execute on a network port using a network protocol.

As with other services, a bound service is associated with one or more ports, protocols, or additional qualifications (e.g., process information, package information). For example, a distributed bound service is associated with one or more ports on each managed server 130 executing the distributed bound service. In one embodiment, the description of a bound service indicates a binding description of the bound service to the managed server 130. The binding identifies the managed server 130 as well as one or more ports used by the service. In particular, the binding description includes at least one port used by one of the bound service's constituent processes that differs from the port typically associated with that process in a given protocol. For example, a PostgreSQL process is typically associated with port 5432 in TCP, but a bound service including the PostgreSQL process includes a binding that overrides the port to a different number.

Providers/Consumers—The one or more providers of the service and the one or more consumers (i.e., users) of the service are managed servers 130, bound services, unmanaged devices 140, and/or labeled devices.

In one embodiment, a rule is represented within the administrative domain-wide management policy 330 using a set of information that includes a rule function portion, a service portion, a provided-by portion, a used-by portion, and an optional rule condition portion. The rule function portion describes the practical effect of the rule and can be associated with one or more settings (function profiles). The service portion describes the service to which the rule applies. If the service portion indicates "All", then the rule applies to all services.

The provided-by (PB) portion describes which managed servers 130, bound service groups, unmanaged devices 140, and/or labeled devices 150 can provide the service (i.e., who the "providers" are). If the PB portion indicates "Anybody", then any actor (e.g., any managed server 130, bound service groups, unmanaged devices 140, and/or labeled devices 150) can provide the service. If the PB portion indicates "Any labeled device", then any managed server 130, bound service group, or labeled device 150 can provide the service. ("Any labeled device" is equivalent to specifying a label set that contains a wildcard, thereby matching all managed servers 130, bound service groups, and labeled devices 150.) Similarly, if the PB portion indicates "Any managed server", then the any managed server 130 can provide the service regardless of the managed server's label. The used-by (UB) portion describes which managed servers 130, bound service groups, unmanaged devices 140, and/or labeled devices 150 can use the service (i.e., who the "consumers" are). Similar to the PB portion, the UB portion can also indicate "Anybody", "Any labeled device", or "Any managed server."

Within the PB portion and the UB portion, a managed server 130 or labeled device 150 is specified by using a label set (i.e., one or more labels that describe the managed server) or a UID. The ability to specify managed servers 130, bound service group, and/or or labeled devices 150 using label sets stems from the logical management model, which references managed servers based on their dimensions and values (labels). An unmanaged device 140 that is unlabeled is specified by using a UID of an unmanaged device group (UDG). If a rule specifies a UDG, then the rule includes additional information regarding the unmanaged devices 140 in that group (e.g., the devices' network exposure information). The PB portion of a rule and/or the UB portion of a rule can include multiple items, including label sets (to specify managed servers 130, bound service groups, and/or labeled devices 150), managed server UIDs, and/or UDG UIDs.

The rule condition portion, which is optional, specifies whether the rule applies to a particular labeled actor (e.g., a managed server 130, a labeled device 150, or a bound service group on a particular managed server 130) and/or a particular network interface or port of that labeled actor. The rule condition portion is a Boolean expression that includes one or more configured characteristics ("CCs"); part of a managed server's description in the administrative domain state 320) and/or network exposure information (e.g., a network interface's BRN identifier, a port's network address; also part of a managed server's description in the administrative domain state 320). A CC portion of the expression specifies whether the rule applies to the particular managed server 130 (or bound service group on a particular managed server 130, or labeled device 150), while a network exposure information portion of the expression specifies whether the rule applies to a particular network interface or port of that managed server 130 (or labeled device 150). For example, if the expression evaluates to "true" for a particular managed server's configured characteristics (specifically, for the values of that managed server's configured characteristics) and a particular network interface's information, then the rule applies to that managed server 130 and that managed server's relevant network interface. Continuing the example, if the expression evaluates to "false", then the rule does not apply to that managed server 130 and that managed server's relevant network interface. As another example, if a configured characteristic stores an indication of which operating system is running on the managed server 130, then a rule condition portion that includes that configured characteristic can control whether the rule applies to a particular managed server 130 based on that server's operating system.

Rules within the administrative domain-wide management policy 330 are organized into rule lists. Specifically, the management policy 330 includes one or more rule lists, and a rule list includes one or more rules and (optionally) one or more scopes. A "scope" constrains where (i.e., to which managed servers 130, bound service group, or labeled devices 150) a rule is applied. A scope includes a provided-by (PB) portion and a used-by (UB) portion that limit the application of the rules in the rule list. The PB portion of the scope limits the PB portion of the rules, and the UB portion of the scope limits the UB portion of the rules. The PB and UB portions of a scope can specify a group of managed servers 130 (or a bound service group, or a group of labeled devices 150) by using a label set. If the label set does not contain a label for a specific dimension, then there is no scoping of that dimension for the resulting group of managed servers 130. If a rule list does not include any scopes, then its rules are applied globally.

Different scopes can be applied to a single rule list. For example, an end-user can build a set of rules that express how the web service tier (managed servers 130 and bound service groups with a <Role, Web> label) consumes services from the database tier (managed servers with a <Role, Database> label), how the load-balancing tier consumes services from the web service tier, and so on. Then, if the end-user wants to apply this rule list to his production environment (managed servers 130 with an <Environment, Production> label) and to his staging environment (managed servers 130 with an <Environment, Staging> label), he does not need to copy or duplicate the rule list. Instead, he applies multiple scopes to a single rule list (a first scope where the PB portion and the UB portion include the <Environment, Production> label and a second scope where the PB portion and the UB portion include the <Environment, Staging> label). The scope abstraction makes the rule list scale from both a usability perspective and a computational perspective.

Now that the administrative domain-wide management policy 330 has been described, it is helpful to work through some examples. Consider an administrative domain 160 with a two-tier application where a user device accesses a web server (the first tier), and the web server accesses a database server (the second tier). In the first tier, the user device is the consumer, and the web server is the provider. In the second tier, the web server is the consumer, and the database server is the provider. The administrative domain 160 includes two instances of this application: one in a production environment and one in a staging environment.

The web servers and the database servers are managed servers 130, and their descriptions (e.g., label sets) are present in the administrative domain state 320. For example, their label sets are:
web server in production: <Role, Web> and <Environment, Production>
database server in production: <Role, Database> and <Environment, Production>
web server in staging: <Role, Web> and <Environment, Staging>
database server in staging: <Role, Database> and <Environment, Staging>
(The Application dimension, the Line of Business dimension, and the Location dimension are not relevant to this example, so their labels are omitted.)

Now consider the following administrative domain-wide management policy 330, which is a security policy that specifies access control and secure connectivity:

```
Rule List #1
   Scopes
      <Environment, Production>
      <Environment, Staging>
   Rules
      #1
         Function: Access Control
         Service: Apache
         PB: <Role, Web>
         UB: Anybody
      #2
         Function: Access Control
         Service: PostgreSQL
         PB: <Role, Database>
         UB: <Role, Web>
Rule List #2
   Scopes: None
   Rules
      #1
         Function: Secure Connectivity
         Service: All
         PB: <Role, Database>
         UB: Any managed server
```

Note that the rules above refer to services simply as "Apache" and "PostgreSQL" for clarity. Remember that a service is a process and is specified by a port/protocol pair and (optionally) additional qualifications, such as process information and/or package information (described above with respect to a description of a managed server 130 within the administrative domain state 320).

Rule List #1/Rule #1 allows any device (e.g., a user device) to connect to a web server and use the Apache service. Specifically, the allowance of a connection is specified by "Access Control" in the Function portion. The "any device" is specified by "Anybody" in the UB portion. The "web server" is specified by "<Role, Web>" (a label set that includes only one label) in the PB portion. The Apache service is specified by "Apache" in the Service portion.

Rule List #1/Rule #2 allows a web server to connect to PostgreSQL on a database server. Specifically, the allowance of a connection is specified by "Access Control" in the Function portion. The "web server" is specified by "<Role, Web>" in the UB portion. The "PostgreSQL" is specified by "PostgreSQL" in the Service portion. The "database server" is specified by "<Role, Database>" (a label set that includes only one label) in the PB portion.

Rule List #1 also prevents inter-environment connections. For example, a web server is allowed to connect to PostgreSQL on a database server if the web server and database server are both in the same environment (e.g., both in the production environment or both in the staging environment). Both servers in the production environment is specified by "<Environment, Production>" (a label set that includes only one label) in the Scope portion, while both servers in the staging environment is specified by "<Environment, Staging>" (a label set that includes only one label) in the Scope portion. (Since the scopes in this example do not distinguish between the PB portion and the UB portion, each scope's label set is applied to both the PB portion and the UB portion.) As a result, a web server is not allowed to connect to PostgreSQL on a database server if the servers are in different environments (e.g., if the web server is in the staging environment and the database server is in the production environment).

Rule List #2 states that whenever any managed server connects to a database server, that connection must be performed through an encrypted channel. Specifically, the "database server" is specified by "<Role, Database>" in the PB portion. The "encrypted channel" is specified by "Secure Connectivity" in the Function portion. The "any managed server" is specified by "Any managed server" in the UB portion. The "whenever" is specified by "All" in the Service portion.

Turning aside from the above example, consider the following two managed servers 130: Server 1 is a web server that is part of production, part of app1, and owned by engineering in California. It would be labeled as:
<Role, Web>
<Environment, Production>
<Application, app1>
<LB, Engineering>
<Location, US>
Server 2 is a database server that is part of production, also part of app1, and also owned by engineering but in Germany. It would be labeled as:
<Role, Database Server>
<Environment, Production>
<Application, app1>
<LB, Engineering>
<Location, EU>

Assume that an access control rule allows all access to all managed servers 130 that are part of app1. This rule would allow Server 1 and Server 2 to communicate with each other and would disallow a managed server 130 in Germany that is part of app2 from communicating with Server 1 or Server 2. Now assume that a secure connectivity rule specifies that all network traffic between EU and US must be encrypted. Rule functions are independently applied. In other words, the secure connectivity rule is a separate policy that is applied independent of the access control rule. As a result, the network traffic from Server 1 to Server 2 would be allowed (given the access control rule) and encrypted (given the secure connectivity rule).

Bound Services

In some embodiments, a managed server 130 has services that are associated with different high-level characteristics (e.g., different roles, environments, applications, or lines of business). These services executing on the same managed server 130 can be described by different label sets. A service having a different label set than the managed server 130 providing the service is referred to as a "bound service." Rules that are applicable to the managed server 130 according its label set are inapplicable to the managed server's bound services because the bound services have a different label set. Accordingly, the administrative domain-wide management policy 330 includes rules applied according to the label set of a service rather than according to the label set of the managed server 130 hosting the service.

A bound service provided by multiple managed servers 130 is referred to as a "distributed bound service." Each of the multiple managed servers 130 providing the distributed bound service provides an "instance" of the distributed bound service. Bound services having the same label set (and accordingly similar high-level characteristics) and provided by the same managed server 130 may be referred to as a "bound service group." The global manager 120 may group bound services into bound service groups automatically (as described with respect to the labeling engine 930) and/or according to instructions from an administrator. Since multiple managed servers 130 provide instances of a distributed bound service, the distributed bound service belongs to a bound service group on each of the multiple managed servers 130. The instances of the distributed bound service have the same label set, so the various bound service groups containing the instances of the distributed bound service have matching label sets.

Figure 3B:
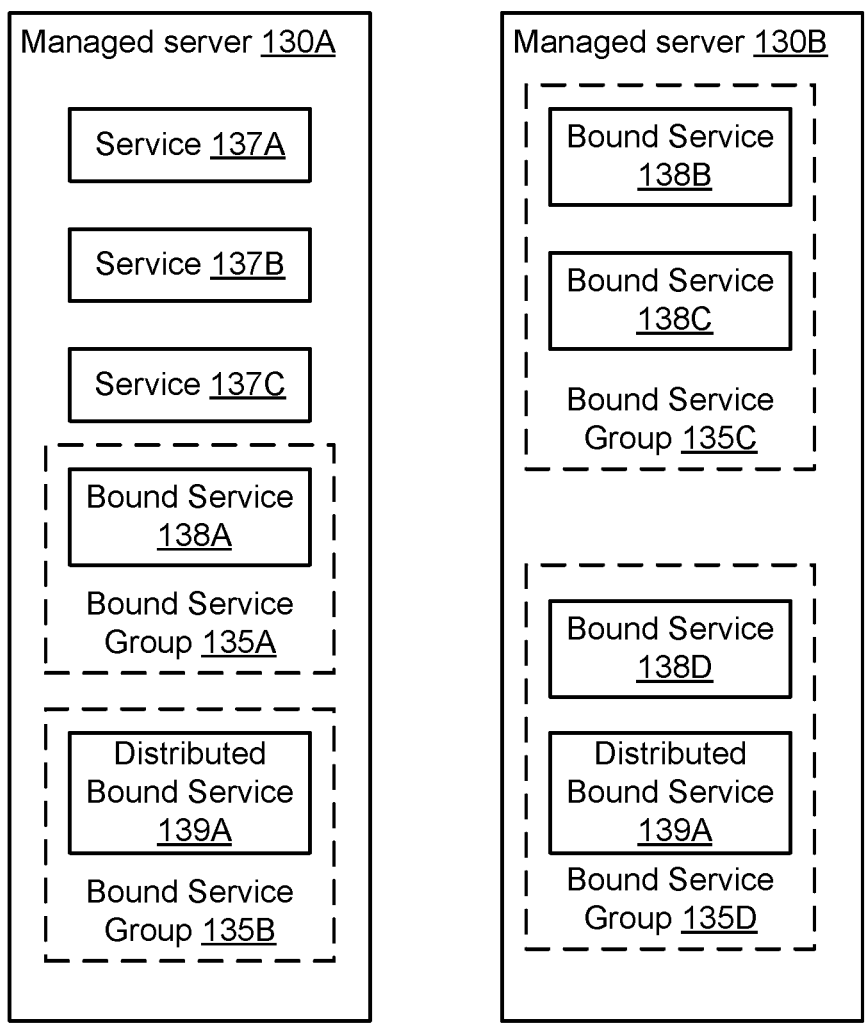
FIG. 3B is a high-level block diagram illustrating various services on managed servers illustrated in FIG. 1, according to one embodiment.

Turning to FIG. 3B, illustrated is a high-level block diagram illustrating example services on managed servers 130A and 130B, according to one embodiment. Managed server 130A includes services 137A, 137B, and 137C, which have similar high-level characteristics and accordingly are accurately described by the managed server 130A's label set. The managed server 130A also includes a bound service 138A, which has a different label set than the managed server 130A. For example, the managed server 130A has the label <Environment, Production> and the bound service 138A has the label <Environment, Staging>. Continuing the example, rules that are relevant to the managed server 130A include rules with a scope including at least one of <Environment, Production> and <Environment, Staging>. However in this example, rules with a scope of <Environment, Production> are not relevant to bound service 138A, and rules with a scope of <Environment, Staging> are not relevant to services 137A-137C. As another example, rules often specify a PB portion and a UB portion in terms of label sets, so different rules are relevant to services 137A-137C and bound service 138A. For brevity, a managed server 130 including one or more bound services with different label sets than the managed server 130 may be referred to as a "diverse managed server 130." In contrast, a managed server 130 executing only services adequately described by the managed server's label set (i.e., a managed server 130 without bound services) may be referred to as a "uniform managed server 130."

Managed server 130B includes bound services 138B, 138C, and 138D. Because managed server 130B includes bound services, it is a diverse managed server 130B. For example, managed server 130B is set of blade servers at a data center providing cloud computing services, and the bound services 138B-D are "micro services" that consume only a fraction of the managed server 130B's processing resources. The administrative domain-wide management policy 330 may consider each of bound services 138B-138D as separate actors when determining which rules apply to managed server 130B and bound services 138B-138D. In some embodiments, a managed server 130 provides bound services with such diverse label sets that it is inaccurate to assign a particular label set to the managed server 130. The global manager 120 may determine relevant rules for a managed server 130 without a label set according to the bound services executing on the managed server 130.

The managed servers 130A and 130B each include an instance of the distributed bound service 139A. The distributed bound service 139A has a label set that differs from the respective label sets of managed servers 130A and 130B. For example, the distributed bound service 139A has a label set including a <Environment, Development> label, the managed server 130A has a label set including a <Environment, Production> label, and the managed server 130B has a label set including a <Environment, Staging> label.

The global manager 120 organizes the bound services on managed servers 130A and 130B into bound service groups with matching label sets. Managed server 130A includes bound service group 135A, which contains bound service 138A, and bound service group 135B, which contains distributed bound service 139A. Accordingly, bound service 138A has a label set that is different from the label set of distributed bound service 139A. For example, bound service 138A and the distributed bound service 139A have labels with different values for the "Line of Business" dimension. Managed server 130B includes bound service group 135C, which contains bound services 138B and 138C, and bound service group 135D, which contains bound service 138D and distributed bound service 139A. Hence, bound services 138B and 138C have matching label sets, but their label sets differ from the label sets of bound service 138D and distributed bound service 139A in at least one dimension. Note that the two instances of distributed bound service 139A are in different bound service groups 135B and 135D that have matching label sets but correspond to different managed servers 130A and 130B.

Processing Server

Returning to FIG. 3A, the processing server 310 generates management instructions for managed servers 130 and bound services executing on those servers and sends the generated management instructions to the servers. The processing server 310 also processes local state information received from managed servers 130. The processing server 310 includes various modules such as a policy engine module 340, a relevant rules module 350, a function-level instruction generation module 360, an actor enumeration module 370, a relevant actors module 380, an administrative domain state update module 385, and an communication rule creation module 390. In one embodiment, the processing server 310 includes a computer (or set of computers) that communicates with the repository 300 and processes data (e.g., by executing the policy engine module 340, the relevant rules module 350, the function-level instruction generation module 360, the actor enumeration module 370, the relevant actors module 380, the administrative domain state update module 385, and the communication rule creation module 390).

The relevant rules module 350 takes as input the administrative domain-wide management policy 330 and an indication of a particular managed server 130 (e.g., that server's UID), generates a set of rules that are relevant to that server, and outputs the set of rules. This is a filtering process by which the relevant rules module 350 examines the management policy 330 and extracts only the relevant rules for the given managed server 130.

The relevant rules module 350 identifies whether the managed server 130 is executing any bound services, and determines which rules are relevant to the managed server 130 according to the overall label set of the diverse managed server 130 as well as label sets of any identified bound services. The relevant rules module 350 iterates through all of the rule lists in the management policy 330 and analyzes the scope of each rule list to determine whether the scope applies to: (a) at least one of the managed server 130 according to the managed server's overall label set or (b) at least one of any identified bound services executing on the managed server 130. If the scope of a rule list applies to the managed server 130 or at least one of its bound services, the relevant rules module 350 analyzes the rules of the rule list to determine which rules apply to the managed server 130 or one of its bound services. For example, a rule applies to the managed servers 130 that provide a distributed bound service if the rule scope matches the label set of the distributed bound service.

A rule applies to a managed server 130 if (a) the PB portion of the rule and/or the UB portion of the rule specifies the managed server 130 or one of its bound services and (b) the condition portion of the rule (if present) evaluates to "true" for that managed server (specifically, for the values of that managed server's configured characteristics and network exposure information). The end result (referred to herein as a "management policy perspective") is a collection of two sets of rules: rules where this managed server 130 provides a service and rules where this managed server 130 consumes a service. For example, a rule applies to those managed servers 130 providing a distributed bound service if (a) the PB portion of the rule specifies the distributed bound service (e.g., using the distributed bound service's label set) and (b) the condition portion of the rule evaluates to "true" for those managed servers 130 providing the distributed bound service. For a diverse managed server 130, each set of relevant rules may be further divided into (a) rules that apply to non-bound services on the managed server 130, and (b) rules that apply to each bound service on the diverse managed server 130.

The function-level instruction generation module 360 takes as input a set of rules (e.g., a management policy perspective generated by the relevant rules module 350), generates function-level instructions, and outputs the function-level instructions. The function-level instructions are later sent to a managed server 130 as part of the management instructions. A function-level instruction is similar to a rule in that each one includes a rule function portion, a service portion, a PB portion, and a UB portion. However, whereas a rule can include multiple items within its PB portion and/or UB portion (including label sets, addresses of network interfaces, managed server UIDs, and/or UDG UIDs), a function-level instruction includes only one item within its PB portion and only one item within its UB portion. Also, whereas a rule can specify a managed server 130, bound service group, or labeled device 150 (including the labeled actor's one or more network interfaces) within its PB portion and/or UB portion, a function-level instruction refers to only one network interface within its PB portion and one network interface within its UB portion. Alternatively or additionally, a function-level instruction refers to an actor-set within its PB portion or UB portion. Alternatively or additionally, the PB or UB portion refers to a particular port associated with a bound service.

The function-level instruction generation module 360 analyzes a rule and generates one or more function-level instructions based on that rule. If the rule's PB portion includes multiple items, the rule's UB portion includes multiple items, or a managed server 130 referenced by the rule (in the PB portion or UB portion) has multiple network ports, then the function-level instruction generation module 360 generates multiple function-level instructions (e.g., one function-level instruction for each possible combination of a PB item, a UB item, and a particular network port). For a diverse managed server 130, the function-level instruction generation module 360 determines the one or more network ports that correspond to the service to which the corresponding rule is relevant. For instance, for a rule that is relevant to a particular bound service group, the function-level instruction generation module 360 determines the one or more network interfaces used by the bound services in the bound service group.

Consider a rule that includes two items in its PB portion (A and B) and two items in its UB portion (C and D). The function-level instruction generation module 360 would generate four function-level instructions with the following PB and UB portions: 1) PB=A, UB=C; 2) PB=A, UB=D; 3) PB=B, UB=C; 4) PB=B, UB=D. Now consider a rule that covers a bound service group in its PB portion or UB portion (e.g., by specifying a UID or a label set), and that bound service group includes multiple bound services using multiple ports. The function-level instruction generation module 360 would generate multiple function-level instructions (e.g., one function-level instruction for each network port used by the bound service group). In other words, the function-level instruction generation module 360 may generate multiple function-level instructions (e.g., one function-level instruction for each combination of bound service actor-set and managed server actor-set).

The function-level instruction generation module 360 analyzes the rules, the functions within those rules, and the function profiles referenced by those rules. If a rule list includes multiple scopes, then the function-level instruction generation module 360 applies those scopes multiple times to the rule list iteratively (thereby generating a complete set of function-level instructions for each scope). Recall that a rule function can be associated with multiple function profiles, and a function profile can include a priority. The function-level instruction generation module 360 orders the rules based on the priorities of the various function profiles such that the function profile with the highest priority is used. The function-level instruction generation module 360 translates the ordered rules into function-level instructions for the managed server 130 to execute. Function-level instructions reference the appropriate managed servers 130, unmanaged devices 140, and/or labeled devices 150, taking into account the network exposure details of the services associated with the rules. The function-level instructions also reference the appropriate services corresponding to the rule (and/or the network addresses of the ports corresponding to the appropriate services), so the function-level instructions can be used with managed servers 130 whether or not they include bound services.

Note that the function-level instruction generation module 360 can generate a function-level instruction for a particular managed server 130 that turns out to be irrelevant for that server. For example, that managed server is covered by the provided-by (PB) portion of a rule, so the function-level instruction generation module 360 generates a corresponding function-level instruction. However, the rule also includes a portion that specifies the managed server's local state (e.g., a service portion that describes the provided service). Since the global manager 120 does not know the managed server's local state (e.g., whether the managed server is actually providing that service), the generated function-level instruction is sent to the managed server. The managed server 130 checks its local state (e.g., whether it is providing that service) and processes the function-level instruction accordingly, as explained below with reference to the policy compilation module 410.

The actor enumeration module 370 takes as input a collection of descriptions of managed servers 130, bound service groups, labeled devices 150, and unmanaged device groups (UDGs) (e.g., the administrative domain state 320), generates representations of those descriptions of servers, devices, bound services, and UDGs in an enumerated form (referred to as "actor-sets"), and outputs the actor-sets. For example, the actor enumeration module 370 enumerates the managed servers 130, labeled devices 150, and the UDGs within the administrative domain state 320 and the possible label sets and assigns each a unique identifier (UID). These actor-sets can then be used in conjunction with UB portions and PB portions of rules and scopes, which specify actors using managed server UIDs, bound service group UIDs, UDG UIDs, and/or label sets.

The actor enumeration module 370 represents a diverse managed server 130 using multiple actors. The actor-set corresponding to a diverse managed server 130 includes an actor corresponding to the managed server's overall label set as well as an actor for each bound service group provided by the diverse managed server 130. A bound service group refers to one or more bound services having the same label set and provided by a particular managed server 130. The representation of an actor corresponding to a group of bound services includes the group's label set as well as a UID assigned to the group of bound services. If a diverse managed server 130 executes a distributed bound service, then the actor representing the diverse managed server's distributed bound service is the bound service group containing the distributed bound service.

Consider a logical management model that includes a set of N dimensions $D_i$ (i=1, . . . , N), and each dimension $D_i$ includes a set $S_i$ of possible values $V_j$ (j=1, . . . , $M_i$) (where the wildcard "*" is one of the possible values). In one embodiment, the actor enumeration module 370 enumerates all label sets that are possible based on the logical management model, which are equal to the Cartesian product given by $S_1 \times S_2 \times \ldots \times S_N$. The size of this set is $M_1 \times M_2 \times \ldots \times M_N$. The enumeration process collapses the multi-dimensional label space of the managed servers 130, bound service groups, and labeled devices 150 into a simple enumerated form.

In another embodiment, the actor enumeration module 370 enumerates only those label sets that are possible based on the administrative domain state 320 (e.g., based on descriptions of managed servers 130 and other actors within the administrative domain 160). For example, consider a logical management model that includes 2 dimensions (X and Y), and each dimension includes 3 possible values (A, B, and *). A managed server 130 with the label set "<X=A>, <Y=B>" can be a member of 4 possible label sets: 1) "<X=A>, <Y=B>", 2) "<X=A>, <Y=*>", 3) "<X=*>, <Y=B>", and 4) "<X=*>, <Y=*>". Note that the managed server's label set exists in 2-dimensional space (X and Y), while possible label sets 2, 3, and 4 are projections of the managed server's label set into sub-dimensional spaces (label set 2 is 1-dimensional space (X), label set 3 is 1-dimensional space (Y), and label set 4 is 0-dimensional space). So, the actor enumeration module 370 enumerates those 4 possible label sets. The managed server 130 with the label set "<X=A>, <Y=B>" cannot be a member of the label set "<X=A>, <Y=A>", so the actor enumeration module 370 does not enumerate that label set.

In yet another embodiment, the actor enumeration module 370 enumerates only those label sets that are used in the administrative domain-wide management policy 330 (e.g., in UB portions and PB portions of rules and scopes).

An actor-set includes a UID and zero or more actor-set records. An actor-set record includes a UID (either a managed server UID, labeled device UID, a UDG UID, a bound service group UID), an identifier of the actor's operating system, and the actor's IP address given the specific BRN. For an actor that is a bound service group, the actor's operating system is the operating system executing the bound services, and the actor's IP address is the IP address of the managed server 130 providing the bound service group. For example, an actor-set might include actor-set records whose IP addresses correspond to all of the managed servers 130 covered by the label set of <Role, Database> and <Environment, Production>. As another example, an actor-set might include actor-set records whose IP addresses correspond to all of the unmanaged devices 140 in the Headquarters UDG. A single actor (e.g., managed server 130, unmanaged device 140, labeled device 150, bound service group) can appear in multiple actor-sets.

Another factor in the actor-set calculation is actors having multiple network interfaces (or associated with multiple ports), plus the inclusion of network topology such as network address translation (NAT). So, there could be two actor-sets for the label set of <Role, Database> and <Environment, Production>: one actor-set with the internet-facing IP addresses of those managed servers 130 (i.e., associated with a first BRN), and a different actor-set for those same managed servers with the private network-facing IP addresses of those managed servers (i.e., associated with a second BRN).

In one embodiment, the actor enumeration module 370 can also update actor-sets based on changes to the administrative domain state 320. For example, the actor enumeration module 370 takes as input actor-sets (previously output by the actor enumeration module 370) and a change to a managed server's description (within the administrative domain state 320), generates updated actor-sets (which are consistent with the changed server description), and outputs the updated actor-sets. Similarly, a detected change of state in an unmanaged device 140 or labeled device 150 triggers generation of updated actor-sets. A bound service group changes when the membership of a bound service group changes (e.g., removal of a constituent bound service, detection of an additional bound service having the same label set as the bound service group) or if the state of the managed server 130 providing the bound services of the bound service group changes. The actor enumeration module 370 generates the updated actor-sets in different ways depending on the type of change to the description of the actor (e.g., managed server 130, unmanaged device 140, labeled device 150, bound service group).

Offline/online change—If the description change indicates that the actor went from online to offline, then the actor enumeration module 370 generates the updated actor-sets by removing the actor's actor-set record from all input actor-sets of which the actor was a member. If the description change indicates that the actor went from offline to online, then the actor enumeration module 370 generates the updated actor-sets by adding the actor's actor-set record to any relevant input actor-sets. (If necessary, the actor enumeration module 370 creates a new actor-set and adds the actor's actor-set record to that new actor-set.) A bound service group experiences an offline/online change when a managed server 130 executing one of the bound service group's constituent bound services switches between online and offline states.

Label set change—If the description change indicates that the actor's label set changed, then the actor enumeration module 370 treats this like a first actor (with the old label set) going offline and a second actor (with the new label set) coming online. As an example, a change in the label set of any of a bound service group's constituent bound services triggers (1) a change in the membership of the bound service group and (2) an update to the corresponding actor record.

Network exposure information change—If the description change indicates that the actor removed a network interface or is associated with a different port, then the actor enumeration module 370 generates the updated actor-sets by removing the actor's actor-set record from all input actor-sets (associated with that network interface's BRN) of which the actor was a member. If the description change indicates that the actor added a network interface (or became associated with a new port), then the actor enumeration module 370 generates the updated actor-sets by adding the actor's actor-set record to any relevant input actor-sets (associated with that network interface's BRN or port's network address). (If necessary, the actor enumeration module 370 creates a new actor-set (associated with that network interface's BRN or port's address) and adds the actor's actor-set record to that new actor-set.) If the description change indicates that the actor changed a network interface's BRN, then the actor enumeration module 370 treats this like a first network interface (with the old BRN) being removed and a second network interface (with the new BRN) being added. If the description change indicates that the actor changed a network interface's IP address (but not the BRN), then the actor enumeration module 370 generates the updated actor-sets by modifying the actor's actor-set record in all input actor-sets (associated with that network interface's BRN) of which the actor was a member. In response to a change in the port assigned to a bound service (or to the port associated with a non-bound service), the actor enumeration module 370 updates the actor-set record of the bound service group corresponding to the bound service.

The relevant actors module 380 takes as input one or more actor-sets (e.g., the managed servers 130, labeled devices 150, the UDGs, and bound service groups) within the administrative domain state 320 in enumerated form, and a set of rules (e.g., a management policy perspective), determines which actor-sets are relevant to those rules, and outputs only those actor-sets. This is a filtering process by which the relevant actors module 380 examines the actor-sets and extracts only the relevant actor-sets for the given set of rules. The relevant actors module 380 performs the filtering by iterating through all of the input actor-sets, analyzing the PB portions and UB portions of the input rules to determine whether a particular actor-set is referenced by any of the rules' PB portions or UB portions. The end result (referred to herein as an "actor perspective") is a collection of actor-sets. The actor perspective is later sent to a managed server 130 as part of the management instructions.

In one embodiment, the relevant actors module 380 uses the input set of rules to generate an "actor-set filter." The actor-set filter selects, from the input actor-sets, only the actor-sets that are relevant to the input rules. In other words, the relevant actors module 380 uses the actor-set filter to filter the input actor-sets into relevant actor-sets.

The policy engine module 340 generates management instructions for managed servers 130 and sends the generated management instructions to the servers. The policy engine module 340 generates the management instructions (using the relevant rules module 350, the function-level instruction generation module 360, the actor enumeration module 370, and the relevant actors module 380) based on a) the administrative domain state 320 and b) the administrative domain-wide management policy 330.

For example, the policy engine module 340 executes the relevant rules module 350, providing as input the administrative domain-wide management policy 330 and the UID of a particular managed server 130. The relevant rules module 350 outputs a set of rules that are relevant to that server (a "management policy perspective"). The policy engine module 340 executes the actor enumeration module 370, providing as input the administrative domain state 320. The actor enumeration module 370 outputs a representation of the descriptions of the managed servers 130, labeled devices 150, unmanaged device groups (UDGs), and bound service groups within the administrative domain state 320 in an enumerated form ("actor-sets"). The policy engine module 340 executes the function-level instruction generation module 360, providing as input the management policy perspective (output by the relevant rules module 350). The function-level instruction generation module 360 outputs function-level instructions. The policy engine module 340 executes the relevant actors module 380, providing as input the actor-sets (output by the enumeration module 370) and the management policy perspective (output by the relevant rules module 350). The relevant actors module 380 outputs only those actor-sets that are relevant to those rules ("relevant actor-sets"). The policy engine module 340 sends the function-level instructions (output by the function-level instruction generation module 360) and the relevant actor-sets (output by the relevant actors module 380) to the particular managed server 130.

In one embodiment, the policy engine module 340 caches information that was generated during the above process. For example, the policy engine module 340 caches, in association with the particular managed server 130, the management policy perspective, the function-level instructions, the actor-set filter, and/or the relevant actor-sets. As another example, the policy engine module 340 caches the administrative domain's actor-sets (which are not specific to a particular managed server 130). As another example, the policy engine module 340 caches the management policy perspective, the function-level instructions, the actor-set filter, and/or the relevant actor-sets in association with a particular bound service group.

Since an administrative domain's actor-sets are based on the administrative domain state 320, a change to the administrative domain state 320 can require a change to the administrative domain's actor-sets. Similarly, since a managed server's management instructions are based on the administrative domain state 320 and the administrative domain-wide management policy 330, a change to the administrative domain state 320 and/or a change to the administrative domain-wide management policy 330 can require a change to the managed server's management instructions. In one embodiment, the policy engine module 340 can update an administrative domain's actor-sets and/or update a managed server's management instructions and then distribute these changes (if necessary) to managed servers 130. The cached information mentioned above helps the policy engine module 340 more efficiently update the administrative domain's actor-sets and/or the managed server's management instructions and distribute the changes.

In one embodiment, the policy engine module 340 updates an administrative domain's actor-sets (based on a change to the administrative domain state 320) and distributes the changes to managed servers 130 as follows: The policy engine module 340 executes the actor enumeration module 370, providing as input the cached actor-sets (previously output by the actor enumeration module) and the changed portion of the administrative domain state 320 (e.g., a changed server description). The actor enumeration module 370 outputs the updated actor-sets. In one embodiment, the policy engine module 340 then sends all of the updated actor-sets to all of the managed servers 130 within the administrative domain 160. However, that embodiment is inefficient, since not all managed servers are affected by changes to all actor-sets.

In another embodiment, only selected actor-sets are sent to selected servers. For example, a particular managed server 130 is sent only those actor-sets that a) were previously sent to that server and b) have changed. The cached relevant actor-sets indicate which actor-sets were previously sent to that server (see (a) above). The policy engine module 340 compares the cached actor-sets to the updated actor-sets to determine which actor-sets have changed (see (b) above). The policy engine module 340 then computes the intersection of (a) and (b). Actor-sets in that intersection are sent to the particular managed server. In one embodiment, for even greater efficiency, actor-sets are sent in "diff" format, which describes differences between the cached actor-sets and the updated actor-sets. For example, the diff format specifies an actor-set identifier, an actor identifier (e.g., a managed server UID, labeled device UID, a UDG UID, bound service group UID), and an indication of whether that actor should be added to, removed from, or modified within the actor-set.

In yet another embodiment, the policy engine module 340 maintains two tables that are organized by service groups. An entry in the table corresponds to either (a) a bound service group operating on a managed server 130 or (b) those services on a managed server 130 that are not bound services. The first table associates a service group with actor-sets of which that service group is a member. A second table associates a service group with actor-sets that are relevant to that service group (e.g., as determined by the relevant actors module 380). In these tables, a service group is represented by, e.g., an identifier (the managed server UID or the bound service group UID), and an actor-set is represented by, e.g., that actor-set's UID. The policy engine module 340 uses the changed portion of the administrative domain state 320 (e.g., the changed server description) to determine which managed server's description changed. The policy engine module 340 uses the first table to determine which actor-sets that service group was a member of. Those actor-sets might change as a result of the changed server description, so the policy engine module 340 uses the second table to determine which service groups those actor-sets are relevant to. The policy engine module 340 performs the intersection computation described above for only those relevant service groups.

In one embodiment, the policy engine module 340 updates a managed server's management instructions (based on a change to the administrative domain state 320) and sends the updated management instructions to the managed server 130 as follows: The policy engine module 340 executes the relevant rules module 350, providing as input the administrative domain-wide management policy 330 and the UID of the managed server 130. If the managed server 130 provides bound services, the policy engine module 340 may also provide the UID of a bound service group provided by the managed server 130. The relevant rules module 350 outputs a set of rules that are relevant to that server (a "management policy perspective"). The policy engine module 340 compares the management policy perspective that was just output to the cached management policy perspective to determine whether they differ. If the just-output management policy perspective and the cached management policy perspective are identical, then the policy engine module 340 takes no further action. In this situation, the previously-generated managed server's management instructions (specifically, the function-level instructions and relevant actor-sets) are consistent with the change to the administrative domain state 320 and do not need to be re-generated and re-sent to the managed server 130.

If the just-output management policy perspective and the cached management policy perspective differ, then the policy engine module 340 determines which rules should be added to the cached perspective and which rules should be removed from the cached perspective. The policy engine module 340 executes the function-level instruction generation module 360, providing as input the rules to add and the rules to remove. The function-level instruction generation module 360 outputs function-level instructions to add and function-level instructions to remove (relative to the cached function-level instructions, which were previously sent to the managed server 130). The policy engine module 340 instructs the managed server 130 to add or remove the various function-level instructions, as appropriate. In one embodiment, for greater efficiency, function-level instructions are sent in "diff" format, which describes differences between the cached function-level instructions and the updated function-level instructions. For example, the diff format specifies a function-level instruction identifier and an indication of whether that function-level instruction should be added to or removed from the previously-sent function-level instructions.

The policy engine module 340 also executes the actor enumeration module 370, providing as input the cached actor-sets and the changed portion of the administrative domain state 320 (e.g., the changed server description). The actor enumeration module 370 outputs the updated actor-sets. The policy engine module 340 executes the relevant actors module 380, providing as input the updated actor-sets and the just-output management policy perspective. The relevant actors module 380 outputs only those updated actor-sets that are relevant to those rules ("updated relevant actor-sets").

The policy engine module 340 compares the updated relevant actor-sets to the cached relevant actor-sets to determine whether they differ. If the updated relevant actor-sets and the cached relevant actor-sets are identical, then the policy engine module 340 sends no actor-sets to the managed server 130. In this situation, the previously-generated relevant actor-sets are consistent with the change to the administrative domain state 320 and do not need to be re-sent to the managed server. If the updated relevant actor-sets and the cached relevant actor-sets differ, then the policy engine module 340 determines which actor-sets should be added, removed, or modified relative to the cached relevant actor-sets. The policy engine module 340 instructs the managed server to add, remove, or modify the various actor-sets, as appropriate. In one embodiment, for greater efficiency, actor-sets are sent in "diff" format, which describes differences between the cached relevant actor-sets and the updated relevant actor-sets. For example, the diff format specifies an actor-set identifier and an indication of whether that actor-set should be added to, removed from, or modified relative to the previously-sent actor-sets.

Recall that the policy engine module 340 can update a managed server's management instructions (based on a change to the administrative domain-wide management policy 330) and send the updated management instructions to the managed server 130. A change to the management policy 330 is, for example, the addition, removal, or modification of a rule or a rule set. In one embodiment, a change to the management policy 330 is generated by interaction with the global manager 120 via a GUI or API. In another embodiment, a change to the management policy 330 is generated by an automated process within the global manager 120 (e.g., in response to a security threat detected by the global manager). The policy engine module 340 updates the managed server's management instructions and sends the updated management instructions to the managed server 130 in a similar way, regardless of whether there was a change to the management policy 330 or a change to the administrative domain state 320. However, there are a few differences.

In the case of a change to the management policy 330, the policy engine module 340 does not necessarily update management instructions for all managed servers 130. Instead, the policy engine module 340 compares the previous management policy 330 to the new management policy 330 to determine which rules should be added, removed, or modified relative to the previous management policy 330. The policy engine module 340 determines which managed servers 130 are affected by the changed rules (e.g., which managed servers 130 or bound service groups are covered by (a) the rules' and/or scopes' PB and/or UB portions and (b) the rules' conditional portions (if any)). The policy engine module 340 executes the relevant rules module 350, providing as input the changed rules (instead of the entire new management policy 330) and the UID of the managed server 130 (for only those servers that are affected by the changed rules).

The administrative domain state update (ADSU) module 385 receives changes to the administrative domain state 320 and processes those changes. A change to the administrative domain state 320 is, for example, the addition, removal, or modification of a description of a managed server 130, bound service group, or labeled device 150 (including the modification of label set or configured characteristics) or a description of an unmanaged device 140 or unmanaged device group. In one embodiment, a change to the administrative domain state 320 originates in local state information received from a particular managed server 130. In another embodiment, a change to the administrative domain state 320 is generated by interaction with the global manager 120 via a GUI or API. In yet another embodiment, a change to the administrative domain state 320 is generated by an automated process within the global manager 120 (e.g., in response to a security threat detected by the global manager).

For example, the ADSU module 385 receives a change regarding a particular unmanaged device 140. The ADSU module 385 stores the new information in the administrative domain state 320 (e.g., as part of an unmanaged device group of which that particular unmanaged device is a member). The ADSU module 385 then updates the administrative domain's actor-sets based on the unmanaged device group change. Specifically, the ADSU module 385 instructs the policy engine module 340 to update the administrative domain's actor-sets. In one embodiment, the ADSU module 385 waits for an event to occur before instructing the policy engine module 340 to update the administrative domain's actor-sets. This event can be, for example, receipt of a user command or occurrence of a specified maintenance window.

As another example, the ADSU module 385 receives a change regarding a particular bound service group on a managed server 130. The ADSU module 385 stores the new information in the administrative domain state 320 as part of the description of that particular managed server 130. The ADSU module 385 then (optionally) analyzes that bound service group's description to determine additional information regarding the bound service group and stores that information in the description. Additionally, if the description of the managed server 130 providing the bound service group changes or if the description of the bound service group changes, then the ADSU module 385 analyzes the change and determines if the change affects the administrative domain's actor-sets and/or the corresponding managed server's management instructions. If the ADSU module 385 determines to update the administrative domain's actor-sets, then the ADSU module 385 instructs the policy engine module 340 to update the administrative domain's actor-sets. In one embodiment, the ADSU module 385 waits for an event to occur before instructing the policy engine module 340 to update the administrative domain's actor-sets. If the ADSU module 385 determines to update the corresponding managed server's management instructions, then the ADSU module 385 instructs the policy engine module 340 to update the managed server's management instructions. In one embodiment, the ADSU module 385 waits for an event to occur before instructing the policy engine module 340 to update the managed server's management instructions. The aforementioned events can be, for example, receipt of a user command or occurrence of a specified maintenance window.

Whether or not the ADSU module 385 determines to update the administrative domain's actor-sets and/or the managed server's management instructions depends on the type of change to the managed server's description (or the description of bound services provided by the managed server 130). In one embodiment, the ADSU module 385 makes this determination as shown in Table 2:

TABLE 2

Whether to update administrative domain's actor-sets and/or managed server's management instructions based on type of server description change

| Type of Change | Whether to Update |
| --- | --- |
| Online to offline | Administrative domain's actor-sets: Yes |
| | Managed server's management instructions: No |
| Offline to online | Administrative domain's actor-sets: Yes |
| | Managed server's management instructions: Yes |

TABLE 2-continued

Whether to update administrative domain's actor-sets and/or managed server's management instructions based on type of server description change

| Type of Change | Whether to Update |
| --- | --- |
| Label set | Administrative domain's actor-sets: Yes |
| | Managed server's management instructions: Yes |
| Configured characteristic | Administrative domain's actor-sets: Yes |
| | Managed server's management instructions: Yes |
| Network exposure info | Administrative domain's actor-sets: Yes |
| | Managed server's management instructions: Yes (unless IP address is the only change) |
| Service info (on managed server 130 without bound services) | Administrative domain's actor-sets: No |
| | Managed server's management instructions: Yes (only in specified situations) |
| Service info (on managed server 130 with bound services) | Administrative domain's actor-sets: Yes |
| | Managed server's management instructions: Yes |

In one embodiment, the ADSU module 385 determines additional information regarding the server by executing the label/configured characteristic engine and providing the server's description as input. The label/CC engine calculates labels/CC values for the server (and for bound services it provides) based on the server's description, the description of any bound services, and label/CC assignment rules. One embodiment of a labeling engine is described with respect to FIG. 9. In another embodiment, the ADSU module 385 determines whether the server is behind a network address translator (NAT) (and, if it is behind a NAT, what type of NAT-1:1 or 1:N).

The communication rule creation module 390 is described below in the section entitled "Communication Rules."

Policy Implementation Module

Figure 4:
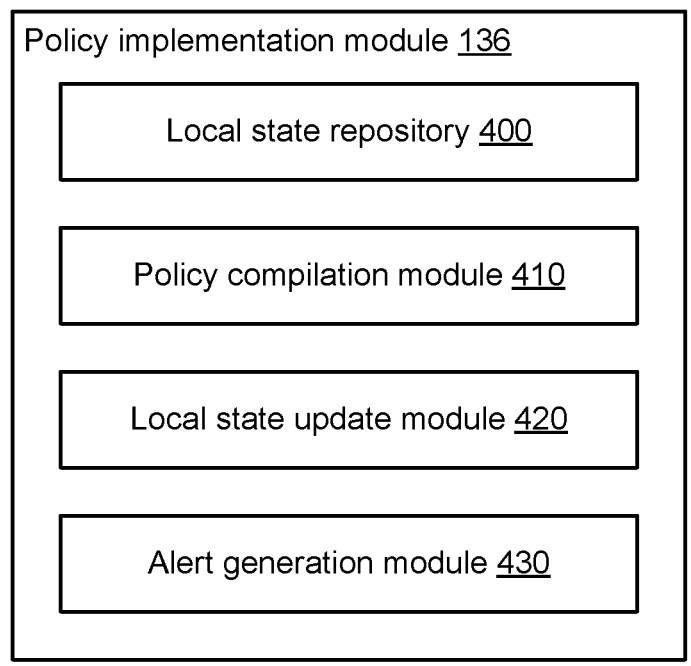
FIG. 4 is a high-level block diagram illustrating a detailed view of a policy implementation module of a managed server, according to one embodiment.

FIG. 4 is a high-level block diagram illustrating a detailed view of a policy implementation module 136 of a managed server 130, according to one embodiment. The policy implementation module 136 includes a local state repository 400, a policy compilation module 410, a local state update module 420, and an alert generation module 430. The local state repository 400 stores information regarding the local state of the managed server 130. In one embodiment, the local state repository 400 stores information regarding the managed server's operating system (OS), network exposure, and services. OS information includes, for example, an indication of which OS is running. Network exposure information and service information were described above with respect to a description of a managed server 130 within the administrative domain state 320.

The policy compilation module 410 takes as input management instructions and state of a managed server 130 and generates a management module configuration 134. For example, the management instructions are received from the global manager 120 and include function-level instructions (generated by the function-level instruction generation module 360) and relevant actor-sets (output by the relevant actors module 380). The state of the managed server 130 is retrieved from the local state repository 400. In one embodiment, execution of the policy compilation module 410 is triggered by a) the managed server powering up or coming online, b) the managed server receiving management instructions, and/or c) the contents of the local state repository 400 changing.

The policy compilation module 410 maps the function-level instructions and relevant actor-sets into a management module configuration 134. For example, the policy compilation module 410 maps an access control function-level instruction (which contains a port and an actor-set reference) into an iptables entry and an ipset entry in the Linux operating system or a Windows Filtering Platform (WFP) rule in the Windows operating system.

The application of management policy at a managed server 130 can be affected by the local state of that server. In one embodiment, the policy compilation module 410 evaluates a condition associated with a received function-level instruction and generates the management module configuration 134 based on the result of that evaluation. For example, the policy compilation module 410 evaluates a condition that references the operating system of the managed server's peer (i.e., the other actor in the relationship) and selects function profile attributes based on the result of that evaluation, where the selected function profile attributes are expressed in the management module configuration 134.

As another example, recall that a managed server 130 can receive a function-level instruction that turns out to be irrelevant for that server. For example, the rule includes a portion that specifies the managed server's local state (e.g., a service portion that describes the provided service). Since the global manager 120 does not know the managed server's local state (e.g., whether the managed server is actually providing that service), the generated function-level instruction is sent to the managed server 130. The policy compilation module 410 checks the managed server's local state (e.g., determines whether the managed server is providing that service). This determination amounts to evaluating a condition that references the managed server's local state. The policy compilation module 410 processes the function-level instruction accordingly. If the policy compilation module 410 determines that the condition evaluates to "true" (e.g., the managed server 130 is providing that service), then the policy compilation module 410 incorporates that function-level instruction into the management module configuration 134. Specifically, the policy compilation module 410 incorporates function-level instructions into the management module configuration 134 only after evaluating the associated condition (which concerns the local state of that server). If the evaluation of the condition is false, then the policy compilation module 410 does not express the function-level instructions in the management module configuration 134. The specific conditions (e.g., their nature and particular values) are extensible. In one embodiment, the conditions are related to the definition of a "service" and include process information and/or package information (described above with respect to a description of a managed server 130 within the administrative domain state 320).

For example, consider a function-level instruction that allows access to only the Apache service inbound on port 80 (i.e., where the managed server 130 is the "provider" or endpoint). The managed server 130 expresses this function-level instruction in the management module configuration 134 to allow access on port 80 only after evaluating the associated condition, which concerns whether the application (executing on that server) that is listening on port 80 is actually Apache and not some other application (rogue or otherwise). The managed server 130 expresses this function-level instruction in the management module configuration 134 only after determining that the associated condition evaluates to "true." If the associated condition evaluates to "false", then the managed server 130 does not express this function-level instruction in the management module configuration 134. As a result, the network traffic is blocked.

In one embodiment, a managed server 130 monitors its outbound connections. The managed server 130 compares outbound network traffic to its internal process table to determine which processes in that table are establishing those outbound connections. The managed server 130 can enforce a rule that allows only certain processes (given a set of requirements, mentioned above as "process information") to establish an outbound connection.

In one embodiment (not shown), the policy compilation module 410 is located at the global manager 120 instead of at the managed server 130. In that embodiment, the global manager 120 does not send management instructions to the managed server 130. Instead, the managed server 130 sends its local state to the global manager 120. After the policy compilation module 410 generates the management module configuration 134 (at the global manager 120), the management module configuration 134 is sent from the global manager 120 to the managed server 130.

The local state update (LSU) module 420 monitors the local state of the managed server 130 and sends local state information to the global manager 120. In one embodiment, the LSU module 420 determines an initial local state of the managed server 130, stores appropriate local state information in the local state repository 400, and sends that local state information to the global manager 120. The LSU module 420 determines the local state of the managed server 130 by inspecting various parts of the server's operating system (OS) and/or file system. For example, the LSU module 420 obtains service information from the OS' kernel tables (networking information), the OS' system tables (package information), and the file system (files and hash values). The LSU module 420 obtains network exposure information from the OS' kernel and and/or OS-level data structures.

After the LSU module 420 sends the initial local state information to the global manager 120, the LSU module monitors changes to the local state. The LSU module monitors changes by, for example, polling (e.g., performing inspections periodically) or listening (e.g., subscribing to an event stream). The LSU module 420 compares recently-obtained local state information to information already stored in the local state repository 400. If the information matches, then the LSU module 420 takes no further action (until local state information is obtained again). If they differ, then the LSU module 420 stores the recently-obtained information in the local state repository 400, executes the policy compilation module 410 to re-generate the management module configuration 134 (and re-configures the management module 132 accordingly), and notifies the global manager 120 of the change. In one embodiment, the LSU module 420 sends changes to local state information to the global manager 120 in "diff" format, which describes differences between the local state information that was previously stored in the local state repository 400 (and, therefore, previously sent to the global manager 120) and the recently-obtained local state information. For example, the diff format specifies a type of local state information (e.g., operating system) and a new value for that information type. In another embodiment, the LSU module 420 sends the entire contents of the local state repository 400 to the global manager 120.

The alert generation module 430 is described below in the section entitled "Communication Rules."

Generating Management Instructions

Figure 5:
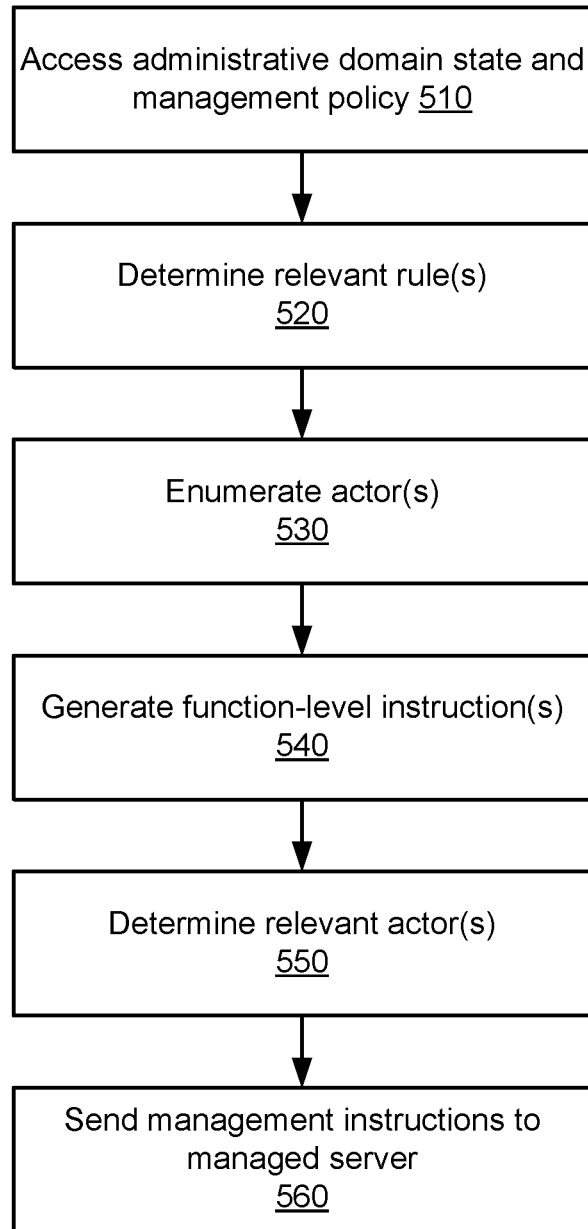
FIG. 5 is a flowchart illustrating a method of generating management instructions for a particular managed server, according to one embodiment.

FIG. 5 is a flowchart illustrating a method 500 of generating management instructions for a particular service group on a particular managed server 130, according to one embodiment. Recall that a service group refers to (a) a bound service group or (b) those services on the managed server 130 that are not bound services. Other embodiments can perform the steps in different orders and can include different and/or additional steps. In addition, some or all of the steps can be performed by entities other than those shown in FIG. 1. In one embodiment, the method 500 is executed multiple times (e.g., once for each managed server 130 in an administrative domain 160).

When the method 500 starts, the administrative domain state 320 and an administrative domain-wide management policy 330 have already been stored in the repository 300 of the global manager 120. At this point, the method 500 begins.

In step 510, the administrative domain state 320 and the administrative domain-wide management policy 330 are accessed. For example, the policy engine module 340 sends a request to the repository 300 and receives the administrative domain state 320 and the administrative domain-wide management policy 330 in response.

In step 520, one or more relevant rules are determined. For example, the policy engine module 340 executes the relevant rules module 350, providing as input the administrative domain-wide management policy 330, the UID of the particular managed server 130, and a UID of a service group. The relevant rules module 350 outputs a set of rules that are relevant to both the managed server 130 and the service group (management policy perspective).

In step 530, actors are enumerated. For example, the policy engine module 340 executes the actor enumeration module 370, providing as input the administrative domain state 320. The actor enumeration module 370 generates a representation of the managed servers 130, labeled devices 150, unmanaged device groups (UDGs), and bound service groups within the administrative domain state 320 in an enumerated form (actor-sets).

In step 540, one or more function-level instructions are generated. For example, the policy engine module 340 executes the function-level instruction generation module 360, providing as input the management policy perspective (generated in step 520). The function-level instruction generation module 360 generates function-level instructions relevant to the input service group.

In step 550, one or more relevant actors are determined. For example, the policy engine module 340 executes the relevant actors module 380, providing as input the actor-sets (generated in step 530) and the management policy perspective (generated in step 520). The relevant actors module 380 outputs only those actor-sets that are relevant to those rules (relevant actor-sets).

In step 560, management instructions are sent to the particular managed server 130. For example, the policy engine module 340 sends the function-level instructions (generated in step 540) and the relevant actor-sets (generated in step 550) to the particular managed server 130.

Note that steps 520 and 540 concern generating the management policy perspective (and resulting function-level instructions) for a particular service group on a particular managed server 130, while steps 530 and 550 concern generating the actor perspective for that service group and the managed server providing the service group. The generation of the management policy perspective and the generation of the actor perspective are minimally dependent on each other, since step 520 generates a set of rules that is used by step 550. Even so, keeping the management policy calculations (i.e., steps 520 and 540) and the actor-set calculations (i.e., steps 530 and 550) separate enhances the scalability of the policy engine module 340. Since the management policy calculations and the actor-set calculations are kept mostly separate, they can be performed in parallel (e.g., even for the same managed server 130 or bound service group). In addition, perspective calculations for different managed servers 130 and service groups can also be performed in parallel. Also, if an actor changes, then only the actor-sets need to be recalculated. (The function-level instructions do not need to be recalculated.) If a rule changes, then only the function-level instructions and the relevant actor-sets need to be recalculated. (The actors do not need to be re-enumerated.)

Configuring the Management Module

Figure 6:
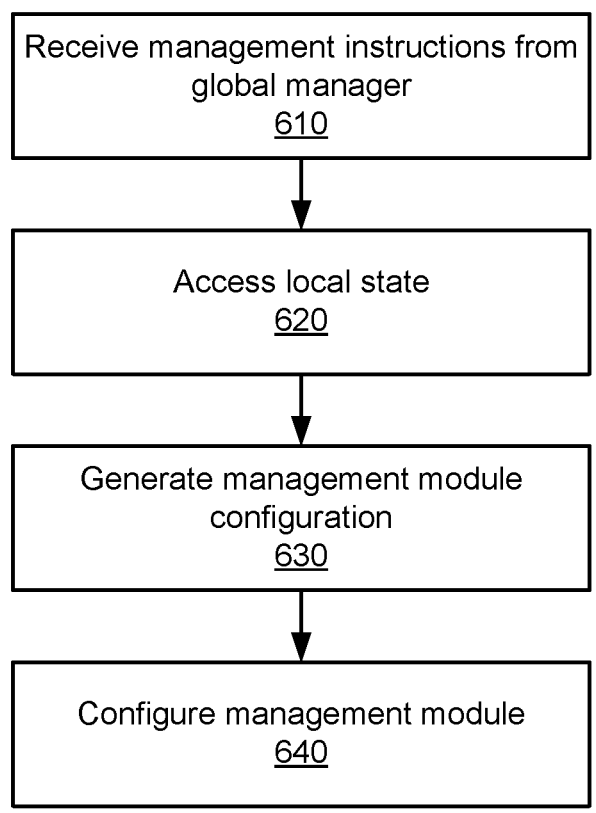
FIG. 6 is a flowchart illustrating a method of generating a configuration for a management module of a managed server, according to one embodiment.

FIG. 6 is a flowchart illustrating a method 600 of generating a configuration 134 for a management module 132 of a managed server 130, according to one embodiment. Other embodiments can perform the steps in different orders and can include different and/or additional steps. In addition, some or all of the steps can be performed by entities other than those shown in FIG. 1.

When the method 600 starts, information regarding the local state of the managed server 130 has already been stored in the local state repository 400 of the policy implementation module 136 in the managed server 130. At this point, the method 600 begins.

In step 610, management instructions are received from the global manager 120. For example, the policy compilation module 410 receives function-level instructions and relevant actor-sets from the global manager 120.

In step 620, the local state is accessed. For example, the policy compilation module 410 accesses information regarding the local state of the managed server 130 that is stored in the local state repository 400.

In step 630, a management module configuration 134 is generated. For example, the policy compilation module 410 takes as input the management instructions (received in step 610) and the local state (accessed in step 620) and generates a management module configuration 134.

In step 640, a management module 132 is configured. For example, the policy compilation module 410 configures the management module 132 to operate in accordance with the management module configuration 134 (generated in step 630).

Monitoring a Managed Server

Figure 7:
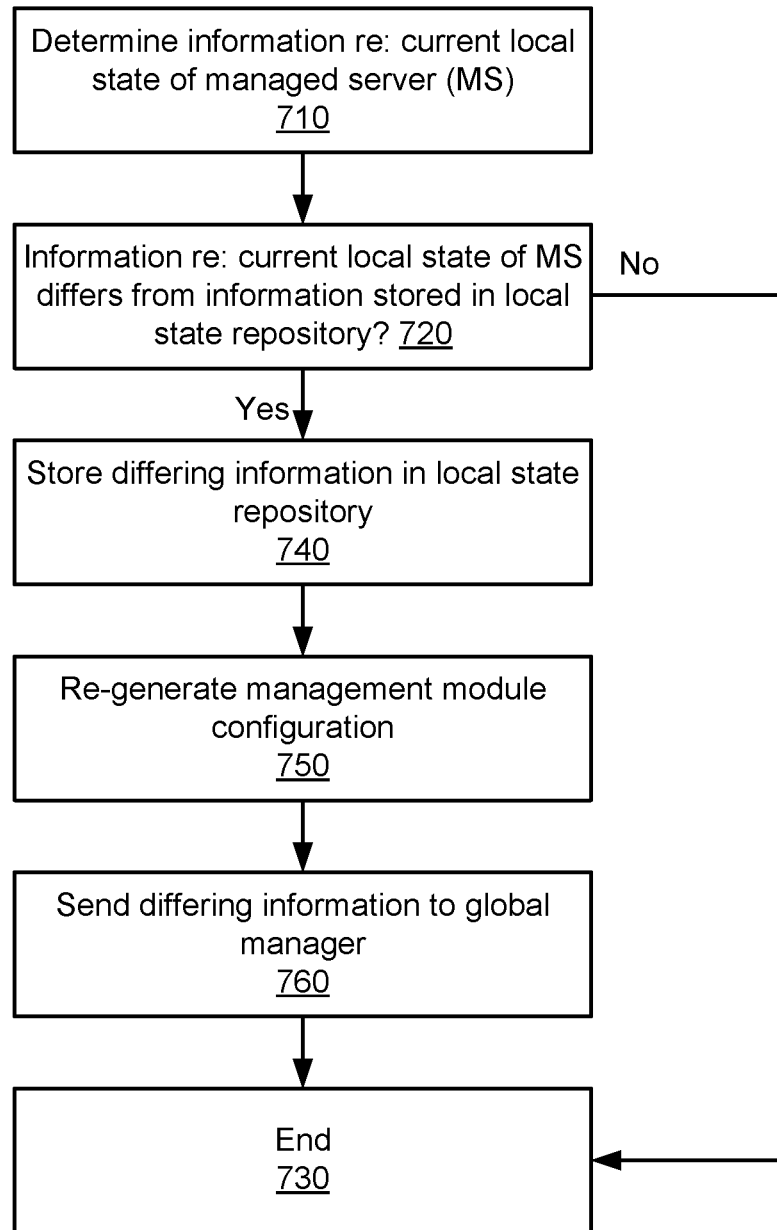
FIG. 7 is a flowchart illustrating a method of monitoring local state of a managed server and sending local state information to a global manager, according to one embodiment.

FIG. 7 is a flowchart illustrating a method 700 of monitoring local state of a managed server 130 and sending local state information to a global manager 120, according to one embodiment. Other embodiments can perform the steps in different orders and can include different and/or additional steps. In addition, some or all of the steps can be performed by entities other than those shown in FIG. 1.

When the method 700 starts, information regarding local state of the managed server 130 has already been stored in the local state repository 400 of the managed server 130. At this point, the method 700 begins.

In step 710, information regarding the current local state of the managed server 130 is determined. For example, the LSU module 420 determines the local state of the managed server 130 by inspecting various parts of the server's operating system (OS) and/or file system to determine services or bound services executed by the managed server 130.

In step 720, a determination is performed regarding whether information regarding the current local state differs from information stored in the local state repository 400. For example, the LSU module 420 performs this determination. If the information does not differ, then the method proceeds to step 730 and ends. If the information does differ, then the method proceeds to step 740.

In step 740, the differing information is stored in the local state repository 400. For example, the LSU module 420 performs this step.

In step 750, the management module configuration 134 is re-generated (because the contents of the local state repository 400 have changed), and the management module 132 is re-configured accordingly. For example, the LSU module 420 executes the policy compilation module 410, which re-generates the management module configuration 134.

In step 760, the differing information is sent to the global manager 120. For example, the LSU module 420 performs this step.

Updating the Administrative Domain State

Figure 8:
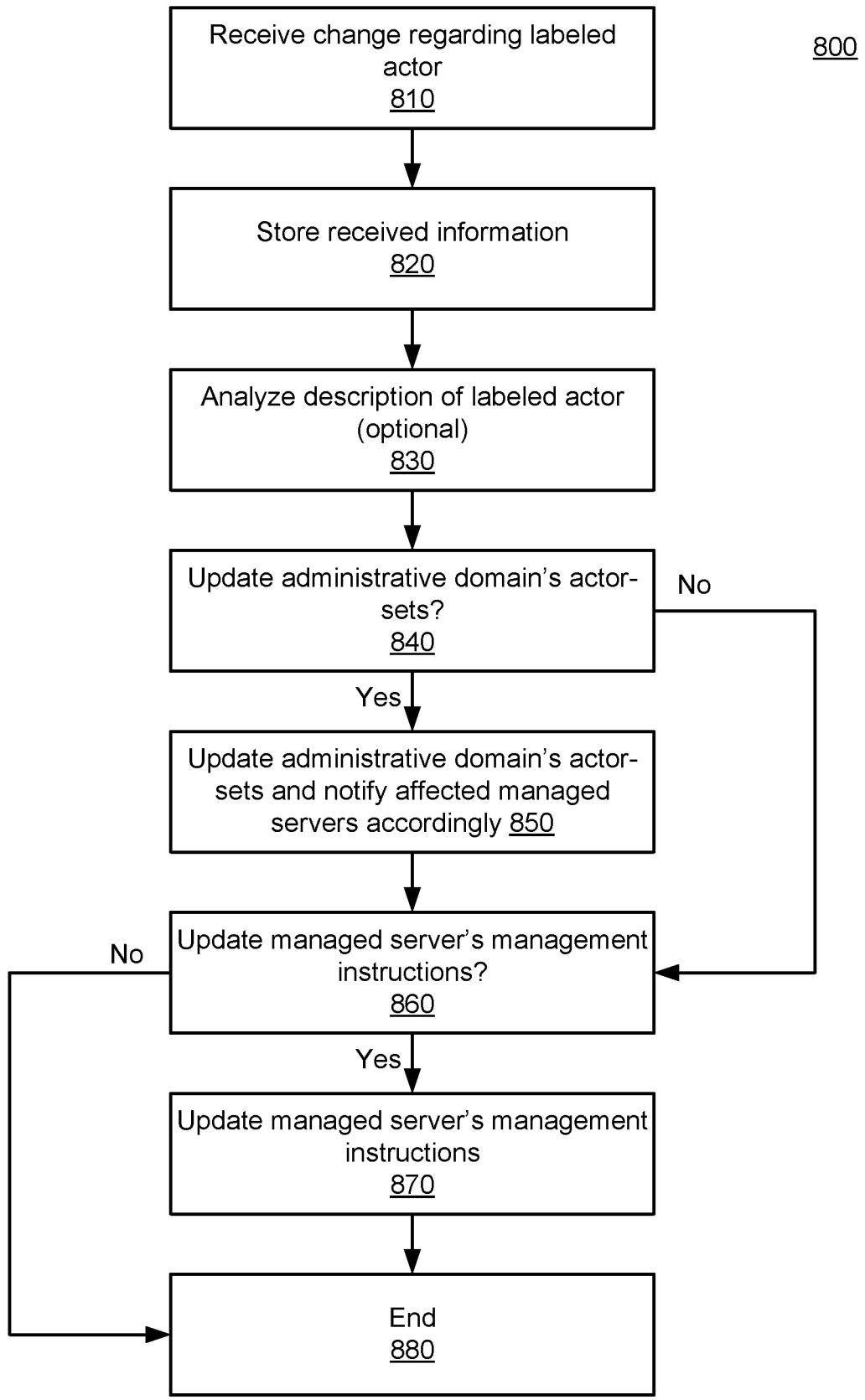
FIG. 8 is a flowchart illustrating a method of processing a change to the state of an administrative domain's computer network infrastructure, according to one embodiment.

FIG. 8 is a flowchart illustrating a method 800 of processing a change to the state 320 of an administrative domain's computer network infrastructure, according to one embodiment. Other embodiments can perform the steps in different orders and can include different and/or additional steps. In addition, some or all of the steps can be performed by entities other than those shown in FIG. 1.

In step 810, a change regarding a particular service group on a particular managed server 130 is received. For example, the administrative domain state update (ADSU) module 385 receives an online/offline indicator, an operating system indicator, network exposure information, and/or service information from the managed server 130 as part of local state information. As another example, the ADSU module 385 receives information indicating that the membership of a bound service group has changed (e.g., due to a change in the label set of one of the bound service group's constituent services). The change may also regard another actor such as an unmanaged device 140 or a labeled device 150.

In step 820, the received information is stored. For example, the ADSU module 385 stores the received online/offline indicator, network exposure information, and/or service information in the administrative domain state 320 (specifically, in the description of the managed server 130 to which the information pertains).

In step 830, the server description is analyzed to determine additional information regarding the server. For example, the ADSU module 385 uses a label/configured characteristic engine to calculate labels/CC values for the bound service group, and/or determines whether the server is behind a network address translator (NAT) (and, if it is behind a NAT, what type of NAT-1:1 or 1:N), and stores that information in the server description. If the service group is a bound service group, the ADSU module 385 determines the label set of the bound service group's constituent bound services. The ADSU module 385 may also use a label/configured characteristic engine to calculate labels/CC values for a labeled device 150 when the state of the labeled device changes. Step 830 is optional.

In step 840, a determination is made regarding whether to update the administrative domain's actor-sets. For example, the ADSU module 385 determines whether to update the administrative domain's actor-sets based on a change to the managed server's description (e.g., due to a change in the label set of a bound service executed by the managed server 130). As another example, the ADSU module 385 determines whether to update the administrative domain's actor-sets based on a change to a labeled device's description. If a determination is made to update the administrative domain's actor-sets, then the method proceeds to step 850. If a determination is made not to update the administrative domain's actor-sets, then the method proceeds to step 860.

In step 850, the administrative domain's actor-sets are updated. For example, the ADSU module 385 instructs the policy engine module 340 to update the administrative domain's actor-sets and notify affected managed servers 130 accordingly. In one embodiment (not shown), the ADSU module 385 waits for an event to occur before instructing the policy engine module 340 to update the administrative domain's actor-sets.

In step 860, a determination is made regarding whether to update the managed server's management instructions. For example, the ADSU module 385 determines whether to update the managed server's management instructions based on a change to the managed server's description. If a determination is made to update the managed server's management instructions, then the method proceeds to step 870. If a determination is made not to update the managed server's management instructions, then the method proceeds to step 880.

In step 870, the managed server's management instructions are updated. For example, the ADSU module 385 instructs the policy engine module 340 to update the managed server's management instructions. In one embodiment (not shown), the ADSU module 385 waits for an event to occur before instructing the policy engine module 340 to update the managed server's management instructions.

In step 880, the method 800 ends.

Communication Rules

Recall that the administrative domain-wide management policy 330 of the global manager 120 includes a set of communication rules 335. The set of communication rules 335 contains one or more communication rules, which are rules that control communication between two actors of the administrative domain. Example rules in the set of communication rules 335 include rules having a rule function specifying permissible communications (referred to herein as "access control rules"), rules having a rule function mandating encryption of communication (referred to herein as "encryption rules"), and rules having a rule function regulating bandwidth-usage (referred to herein as "bandwidth rules"). Other example communication rules are possible, such as a rule specifying a Layer-7 service to apply to a communication.

Broadly, a communication rule authorizes communication between a first actor (e.g., a managed server 130, a bound service) and a second actor (e.g., another managed server 130, another bound service, an unmanaged device 140, a labeled device 150, or a device external to the administrative domain 180). A communication rule specifies a provided-by (PB) portion, a used-by (UB) portion, a service. For example, an access control rule specifies whether a consumer specified by the UB portion may use a service from a provider specified by the PB portion. In one embodiment, the access control rules are used in a pure "whitelist" model in which a consumer may access a service on a provider only if the set of access control rules 335 includes an access control rule with matching PB, UB, and service portions. As another example, an encryption rule mandates a particular type of encryption for communication between a consumer and provider of a service specified by the rule.

A communication control rule may only partially specify the PB, UB, and service portions by using a wildcard in place of one or more portions. For example, if an access control rule has a UB portion that specifies a wildcard, then any managed server 130, unmanaged device 140, labeled device 150, or other device external to the administrative domain 160 may access the service. The PB and UB portions may specify one or more particular actors (e.g., using managed server UIDs, bound service group UIDs, or UDG UIDs), one or more label sets, or a combination thereof. If the PB or UB portion specifies the UID of a distributed bound service, then the PB or UB portion is equivalent to a PB or UB portion that specifies the UIDs of the managed servers 130 executing the instances of the distributed bound service. An example access control rule has a PB portion indicating a particular managed server 130 and a UB portion indicating the label set <Role, Database Server> and <Environment, Production>. The example access control rule allows managed servers 130 having a "Database Server" role and belonging to the "Production" environment to access the service at the particular managed server 130. The example access control rule also allows a bound service having the "Database Server" role and belonging to the "Production" environment to access the service even in the bound service is provided by a managed server 130 having a label set with values for the role and environment dimensions.

Recall that the policy implementation module 136 of a managed server 130 includes an alert generation module 430. The alert generation module 430 monitors communication (also referred to as "network traffic") between the managed server 130 and other actors (managed servers 130, unmanaged devices 140, labeled devices 150, bound service groups, or devices external to the administrative domain 160) for compliance with access control rules contained in the management module configuration 134. The alert generation module 430 generates an alert in response to detecting a communication that does not comply with the access control rules (referred to as an "unauthorized communication") and sends the alert to the global manager 120, where the alert is processed by the communication rule creation module 390 (specifically, by the alert processing module 950). An unauthorized communication includes an attempt by a consumer to use a service provided by the managed server 130 as well as an attempt by the managed server 130 to use a service provided by another actor. For example, an attempt to send network traffic to or receive network traffic from a port associated with a service can be an unauthorized communication. In an embodiment where the access control rules serve as a whitelist of permissible activities, the management module 132 allows attempted communication that matches an access control rule and denies attempted communication that does not match an access control rule.

When the management module 132 denies or blocks communication to or from the managed server 130, the alert generation module 430 generates an alert. The alert describes the service, the provider of the service (e.g., using the UID or label set of the relevant actor), and the consumer of the service (e.g., using the UID or label set of the relevant actor) corresponding to the communication. The alert may contain relevant service information about the service as well as network exposure information about the provider and consumer. The alert may contain communication information that describes characteristics of the communication. Communication information may include timing, duration, frequency, protocol type, data size (e.g., total size, packet size), or data rate of the attempted communication. For example, the communication information differentiates between a single attempt to access a service and repeated attempts to access the service. Communication information may also describe routing information of communication such as source address, destination address, and path information (e.g., load balancers and NAT devices routing the unauthorized communication).

Communication Rule Creation Module

Figure 9:
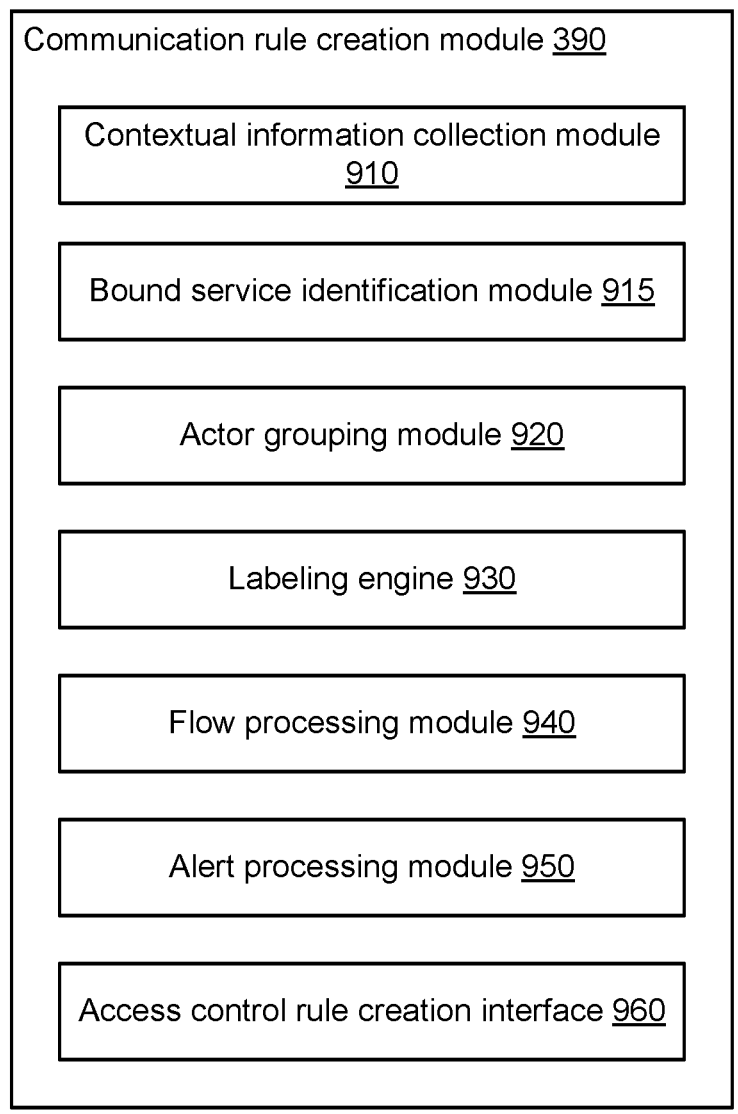
FIG. 9 is a high-level block diagram illustrating a detailed view of an access control rule creation module of a global manager, according to one embodiment.

Recall that the processing server 310 of the global manager 120 includes an communication rule creation module 390. FIG. 9 is an high-level block diagram illustrating a detailed view of the access control rule (ACR) creation module 390 of the global manager 120, according to one embodiment. The ACR creation module 390 includes a contextual information collection module 910, a bound service identification module 915, an actor grouping module 920, a labeling engine 930, a flow processing module 940, an alert processing module 950, and an access control rule (ACR) creation interface 960.

The contextual information collection module 910 obtains contextual information describing actors in the administrative domain 160 (managed servers 130, unmanaged devices 140, labeled devices 150, bound services) and describing communication sent or received by actors in the administrative domain 160. The contextual information collection module 910 may also obtain service information describing individual services on individual devices. Contextual information includes managed server information, service information, unmanaged device information, external device information, communication information, and administrative domain information.

Managed server information describes characteristics of a managed server 130. Managed server information includes service information such as process information and package information, as described above with respect to the administrative domain state 320. Managed server information may describe identifiers (e.g., UID, internet protocol (IP) address, media access control (MAC) address, host name), hardware resources (e.g., processor type, processor throughput, processor load, total memory, available memory, network interface devices, storage device type), or managed server type (e.g., physical device, cloud-provided virtual device, virtual machine, Linux container). Managed server information may describe software resources, such as the operating system and other software described by process information and package information.

The contextual information module 910 obtains service information from managed servers 130 about services executing on the managed servers 130. In some embodiments, the contextual information module 910 obtains service information about services without information indicating whether the services are bound services. In other embodiments, the contextual information module 910 obtains a list of bound services and aggregates information from bound services and/or bound service groups. Since the contextual information collection module 910 may obtain bound service information before or after bound services are labeled and sorted into bound service groups, bound service information may be on a per-bound service basis or a per-bound service group basis. Such bound service information includes process and package information of constituent bound services, the bound service UID, as well as managed server information of the managed server 130 providing the bound services of the bound service group as well as any environment information associated with the managed server 130. Bound service information may also specify ports used by the bound service on the managed server 130, where the specified ports override the ports typically assigned to the bound service. For a distributed bound service, the bound service information includes pointers (such as UIDs) to the managed servers 130 providing the distributed bound service.

A virtualized or cloud-based managed server 130 is also associated with environment information, which describes the provider of the managed server 130 (e.g., a proprietary data center, a third-party private data center, a cloud provider) as well as the communication protocol (e.g., encapsulation information, network address, network address translation) to communicate with the provider. Managed server information about a managed server 130 is stored in the managed server's local state repository 400 and sent to the global manager 120 for processing by the contextual information collection module 910. To retrieve managed server information from a virtualized or cloud-based managed server 130, the contextual information collection module 910 may query the cloud service provider or the software providing the virtual server to send managed server information or other contextual information.

Unmanaged device information describes characteristics of unmanaged devices 140 and labeled devices 150. Unmanaged device information includes network exposure information (as described above with respect to the administrative domain state 320), identifiers (e.g., UDG UID, IP address, MAC address, device name), hardware resources, software resources, or network connectivity (e.g., available ports, mapping between ports and services) of an unmanaged device 140 or labeled device 150. A managed server 130 may collect unmanaged device information about unmanaged devices 140 (or labeled devices 150) that communicate with the managed server 130 and send the unmanaged device information to the global manager 120 for processing by the contextual information collection module 910. Alternatively or additionally, the global manager 120 queries or probes unmanaged devices 140 (or labeled device 150) in the administrative domain 160 to collect unmanaged device information. Since unmanaged devices 140 and labeled devices 150 do not include a policy implementation module 136 that reports the unmanaged device's local state, unmanaged device information may be incomplete or less detailed than managed server information.

External device information describes characteristics of devices external to the administrative domain 160 communicating with managed servers 130. External device information may include identifiers (e.g., IP address, uniform resource locator (URL), other web address), hardware resources, software resources, or network connectivity of an external device. Managed servers 130 may collect external device information and send the information to the global manager 120 for processing by the contextual information collection module 910, but much external device information may not be visible to managed servers 130. In addition, external device information describes reputation information of the external device, which indicates trustworthiness of the external device. In one embodiment, the contextual information collection module 910 obtains reputation information matching the external device's identifier. Using the reputation information, the contextual information collection module 910 classifies the external device as safe, malicious, or neutral. Reputation information may be a binary indicator (e.g., whether the external device's identifier is on a blacklist) or a score (e.g., a relative assessment of danger associated with an identifier).

Communication information is described above with respect to the alert generation module 430. A managed server 130 sends communication information to the global manager 120 that describes communication sent or received by the managed server 130. In one embodiment, a managed server 130 sends communication information about communication independently of evaluating whether the communication is authorized or unauthorized. When the contextual information collection module 910 receives duplicate communication information describing the same communication, the contextual information collection module 910 may merge or de-duplicate the duplicate communication information. For example, the contextual information collection module 910 de-duplicates communication information received from two managed servers 130, one providing a service and one consuming the service.

The contextual information collection module 910 generates administrative domain information based on contextual information received from managed servers 130. Administrative domain information aggregates contextual information over the administrative domain 160 or over a subset of actors in the administrative domain 160. The subset of actors in the administrative domain may be managed servers 130, bound services, bound service groups, and/or labeled devices 150 described by a label set. In one embodiment, administrative domain information describes communications having at least one common characteristic. The common characteristic may be a particular port, process, protocol, or actor (e.g., a managed server 130, an unmanaged device 140, a labeled device 150, a bound service group, a bound service, an external device). For example, the contextual information collection module 910 generates administrative domain information indicating the number of managed servers 130 having corrupted binaries associated with a particular service. As another example, the contextual information collection module 910 generates administrative domain information indicating a number of managed servers 130 scanned by a particular actor. "Scanning" refers to sending a request (e.g., probe) to a managed server 130 and using the managed server's response (or lack thereof) to obtain or automatically determine the configuration of the managed server 130 and processes executing on the managed server 130.

In one embodiment, the contextual information collection module 910 generates administrative domain information indicating unusual activity within the administrative domain 160. The contextual information collection module 910 identifies contextual information associated with a particular actor or an actor group having a common label set, a common service, or some other characteristic. The contextual information collection module 910 summarizes the contextual information using a quantity (e.g., amount of communication, number of corrupted files) and compares the quantity to a threshold quantity. The threshold quantity may be based on a preconfigured setting or may be determined dynamically based on previous historical norms for the quantity. For example, the threshold quantity is two standard deviations above the weekly moving average for the quantity. In response to the comparison to the threshold quantity, the contextual information collection module 910 determines whether the summarized contextual information is unusual. For example, the contextual information collection module 910 determines that a managed server 130 is attempting to access an unusual number of ports unassociated with any services if the number of such ports that the managed server 130 has accessed exceeds a threshold number.

The bound service identification module 915 takes as input contextual information describing individual services and identifies which of the services are bound services. The bound service identification module 915 may obtain a listing of bound services provided by an administrator through a user interface. For example, the list identifies the managed servers 130 providing the respective bound services and whether the bound services are instances of distributed bound services.

In some embodiments, the bound service identification module 915 determines that a service is a bound service because the service was instantiated on a managed server 130 by another actor having a different label set than the managed server 130. The bound service identification module 915 may also identify bound services by analyzing properties of services and flagging as bound services those services with different properties than the other services on the same managed server 130. For example, the bound service identification module 915 uses a port override, in combination with other service information, to determine that a service is a bound service. The bound service identification module 915 may identify bound services by comparing communication patterns of services on a managed server 130 and flagging as bound services those services that communicate with different actors than the other services on the managed serve 130. The bound service identification module 915 may also identify services as bound services by analyzing characteristics of a service as indicated by a label (e.g., a label provided by an administrator or determined by the labeling engine 930). If the obtained label for a service differs from labels of the majority of other services on a managed server 130, then the bound service identification module 915 determines that the service is a bound service.

In addition, the bound service identification module 915 may group identified bound services into bound service groups. The bound service identification module 915 obtains labels of bound services from the labeling engine 930 and collects bound services on the same managed server and having matching label sets into sub-lists, which correspond to bound service groups. The bound service identification module 915 may also assign a UID to each bound service and/or bound service group. The bound service identification module 915 outputs the sub-lists identifying bound services in a bound service group as well as corresponding UID, if assigned.

The actor grouping module 920 obtains communication information describing communication between actors in the administrative domain 160. Based on the communication information, the actor grouping module 920 groups the managed servers 130, bound service groups, unmanaged devices 140, and/or labeled devices 150 into application groups. An application group is a set of actors (e.g., managed servers 130, unmanaged devices 140, labeled devices 150, bound services, bound service groups) having significant volume of communication within the group compared to volume of communication with actors external to the group. For purposes of determining application groups, the actor grouping module 920 separates communications resulting from bound services executing on a managed server 130 from communications attributable to non-bound services on the managed server 130.

In one embodiment, the actor grouping module 920 constructs a graph where the nodes represent actors in the administrative domain 160 and where the edges represent communication between the actors. The edges have binary values indicating presence/absence of communication between the nodes or have non-binary values quantifying the volume of communication (e.g., frequency, data size, duration). For example, the value of an edge connecting two nodes is the daily quantity of data exchanged between a managed server 130 corresponding to the first node and a bound service corresponding to the second node. The graph may be undirected with edges that disregard direction of communication, or the graph may be directed with directed edges according to direction of communication. For example, a directional edge pointing away from a node indicates that the corresponding managed server 130 is a consumer of a service, and a directional edge pointing towards a node indicates that a corresponding bound service is the provider of a service. Since managed servers 130 report presence and/or quantity of communication between actors to the global manager 120, the graph may include values of edges between nodes where at least one node corresponds to a managed server 130. For the same reason, values of edges between two unmanaged devices 140 or labeled devices 150 may be unknown.

Using the graph representation of the administrative domain 160, the actor grouping module 920 groups the actors into application groups. In one embodiment, the actor grouping module 920 partitions the graph into sub-graphs each corresponding to an application group. For example, the actor grouping module 920 applies a depth-first search, a k-means cluster, or a minimum cut algorithm to partition the graph. In other words, the actor grouping module 920 groups the managed servers 130 into application groups by applying a graphical analysis to communication information gathered by the contextual information collection module 910. In one embodiment, the actor grouping module 920 constructs a graph where nodes correspond to a port-managed server 130 combination and where edges represent communication between two combinations of port and managed server. Using such a graph, the actor grouping module 920 may identify a bound service from a service on a managed server 130 that is responsible for communication through one or more ports grouped differently from a majority of other ports on the managed server 130.

The labeling engine 930 obtains managed server information and bound service information, which the labeling engine 930 uses to determine labels for managed servers 130, bound services, and unmanaged devices (to transform the latter to a labeled device 150). Since managed server information (and bound service information) is typically more extensive than unmanaged device information, many of the following examples concern using managed server information to determine label sets for managed servers 130 and bound services. However, if the labeling engine 930 obtains sufficiently detailed unmanaged device information about an unmanaged device 140, the labeling engine may use the unmanaged device information to determine a label set for the unmanaged devices 140, thereby transforming it into a labeled device 150.

In one embodiment, the labeling engine 930 determines a group-level label set (i.e., one or more group-level labels) to associate with the labeled actors in an application group. In one embodiment, the group-level label set includes labels with dimensions corresponding to the environment, application, and location of the labeled actors. Labels are described further with respect to Table 1 and the administrative domain-wide management policy 330. The labeling engine 930 may determine the value of a labeled actor's location dimension based on locations of web addresses (e.g., an IP address and/or a URL) associated with the labeled actor. The labeling engine 930 may determine the value of a labeled actor's label based on conditional heuristics that use contextual information (and/or information derived from contextual information). A conditional heuristic can be created by an administrator or can be preconfigured. For example, a conditional heuristic specifies that if a managed server 130 is provided by a particular cloud service provider or located in a particular data center, then the labeling engine 930 determines a particular value for the managed server's line of business dimension. As another example, a conditional heuristic specifies that if a bound service group contains a particular file or process (or a particular set of files or processes), then the labeling engine 930 determines a particular value for the managed server's application dimension. The labeling engine 930 may request an administrator to indicate a group-level label set or to verify an automatically generated group-level label set. The labeling engine 930 modifies the group-level label set in response to an indication or correction by the administrator.

Besides group-level label sets applicable to an application group, the labeling engine 930 determines role labels (i.e., labels with a role dimension) for individual labeled actors within an application group. In one embodiment, the labeling engine 930 determines a role label for a managed server 130 based on hardware resources, service information, or other managed server information. For example, the labeling engine 930 determines that a managed server 130 has a "Database" role if the total available memory exceeds a threshold. As another example, the labeling engine 930 determines that a managed server 130 has a "Load Balancer" role based on the number of network interfaces. Similarly, the labeling engine 930 determines a role label for a bound service based on the bound service's associated services or processes. For example, a SQLServer process indicates that a service has a "Database" role. In one embodiment, the labeling engine 930 obtains information regarding processes executing on a managed server 130 from managed server information and determines the value of the role dimension based on the processes. Table 3 illustrates an example mapping between processes and role dimension values.

TABLE 3

Mapping between processes and role dimension values

| Process | Role dimension value |
|---|---|
| Postgres | Database |
| Oracle | Database |
| SQLServer | Database |
| Apache | HTTP server |
| NGINX | HTTP server |
| HAProxy | Load balancer |

The flow processing module 940 obtains communication information between actors in the administrative domain 160 and generates access control rules corresponding to the communication information. In one embodiment, the flow processing module 940 identifies communication not authorized by an access control rule and generates an access control rule authorizing the communication. To generate the access control rule, the flow processing module 940 identifies the service generating the communication, the provider of the service, and the consumer of the service. The flow processing module 940 generates the access control rule with a service portion indicating the identified service, a PB portion indicating the identified provider, and a UB portion indicating the identified consumer. In one embodiment, the flow processing module 940 assumes that there are no abnormal or malicious communications in the administrative domain 160 and, accordingly, generates access control rules authorizing any communication present in the administrative domain 160.

In one embodiment, the flow processing module 940 generates access control rules based on group-level label sets and role labels of labeled actors (e.g., managed servers 130, labeled devices 150, bound service groups). The flow processing module 940 determines a target access control rule. For example, the target access control rule is specified by an administrator through a GUI (e.g., by indicating a particular edge of a displayed graph corresponding to the graph generated by the actor grouping module 920). The generated access control rule specifies a service, a first labeled actor as a provider of the service, and a second labeled actor as a consumer of the service. The flow processing module 940 identifies role labels and group-level label sets of the first and second labeled actors generated by the labeling engine 930. The flow processing module 940 then generates additional access control rules applying to other consumer-provider pairs of labeled actor using the specified service (corresponding to particular edges of the displayed graph). The identified managed servers 130 that are providers of the service have group-level label sets and role labels matching those of the first labeled actor. The identified managed servers 130 that are consumers of the service have group-level label sets and role labels matching those of the second labeled actor. Alternatively or additionally to generating additional access control rules covering the identified consumer-provider pairs of labeled actors, the flow processing module 940 broadens the target access control rule to include the identified consumer-provider pairs of labeled actors. For example, the broadened access control rule's PB portion and UB portion are specified in terms of label sets including the role label and group-level label sets rather than in terms of UIDs of particular labeled actors.

In one embodiment, the flow processing module 940 generates an access control rule controlling communication between a first labeled actor and an unlabeled actor (e.g., an unmanaged device 140 (or UDG), an external device outside of the administrative domain 160). The flow processing module 940 identifies an existing access control rule specifying a service, a first labeled actor, and the unlabeled actor. The flow processing module 940 identifies a second labeled actor having similar labels (including role label and group-level label set) as the first labeled actor. The first and second labeled actors are either both consumers of the specified service or both providers of the specified service. The flow processing module 940 generates another access control rule authorizing service-related communication between the second labeled actor and the unlabeled actor. Alternatively or additionally to generating an additional access control rule, the flow processing module 940 broadens the existing access control rule by specifying the access control rule's PB portion or UB portion in terms of the first labeled actor's label set (including the role label and group-level label set) rather than in terms of a UID of the first labeled actor.

In one embodiment, the flow processing module 940 generates rules to modify the server state of the managed servers 130 within the administrative domain 160. The server state determines to what extent the management modules 132 implement the access control rules. In an enforcement state, the management modules 132 block or terminate communication that is unauthorized according to the access control rules. For example, in a pure whitelist policy, the management modules 132 block or terminate communications that do not match at least one access control rule. The server states also include a build state and a test state, where the management modules 132 permit communications even if the communications are not authorized by an access control rule. To initiate a build state or test state, the flow processing module 940 generates an unrestricted access control rule with PB, UB, and service portions that specify wildcards. In other words, the unrestricted access control rule authorizes all communication because there are no restrictions on the access control rule's applicability to various services or actors. To transition to enforcement state from build state or test state, the flow processing module 940 removes the unrestricted access control rule.

The alert processing module 950 obtains alerts from managed servers 130, processes the alerts, and (if appropriate) generates access control rules based on the obtained alerts. In one embodiment, the alert processing module 950 obtains alerts from managed servers 130 when the managed servers 130 are in an enforcement state or a test state. When a managed server 130 is in a build state, the alert processing module 950 instructs the managed server 130 not to generate alerts in response to detecting communication that is not authorized by an access control rule. When a managed server 130 is in a test state, the alert generation module 430 generates alerts indicating unauthorized traffic even though the management module 132 is not enforcing the access control rules to block the unauthorized traffic.

Before generating an access control rule in response to an alert, the alert processing module 950 classifies the communication that triggered the alert using obtained contextual information relevant to the alert. The contextual information includes communication information describing the communication, managed server information about any managed servers 130 sending or receiving the communication, or administrative domain information. If the alert is generated in response to communication with an external device, the contextual information includes external device information. If the alert is generated in response to communication with an unmanaged device 140 or labeled device 150, the contextual information includes unmanaged device information. The alert processing module 950 classifies the communication triggering the alert as being legitimate or malicious based on the obtained contextual information. For example, if the external device information indicates that the external device is malicious, then the communication is classified as malicious.

In one embodiment, the alert processing module 950 classifies communication as malicious if the administrative domain information indicates that the actor initiating the communication is associated with unusual activity. The contextual information collection module 910 may generate administrative domain information summarizing the number of alerts associated with a common characteristic such as a common actor, process, port, or protocol. If the number of alerts associated with the common characteristics exceeds a threshold number, then the contextual information collection module 910 classifies the communication as malicious. For example, if the number of alerts generated in response to traffic initiated by a bound service of a managed server 130 exceeds a threshold number, then communication initiated by the bound service on the managed server 130 is classified as malicious.

The alert processing module 950 may determine that obtained administrative domain information indicates the presence of a progressive infection. In a progressive infection, malicious software spreads across the administrative domain 160 over time. If administrative domain information indicates that the number of alerts from a first actor (e.g., a bound service on a managed server 130) exceeds a threshold, and if a second actor (e.g., another managed server 130) in communication with the first actor begins generating alerts, then the alert processing module 950 determines that the alerts are associated with a progressive infection. Accordingly, the alert processing module 950 classifies the communication triggering alerts as malicious.

Alternatively or additionally to classifying the alert according to contextual information, the alert processing module 950 notifies an administrator in response to receiving the alert. Notifying the administrator may include reporting contextual information related to the communication triggering the alert. The alert processing module 950 may receive a classification from the administrator indicating whether the corresponding communication is legitimate or malicious.

The alert processing module 950 processes an alert according to the classification of the corresponding communication. If the corresponding communication is classified as malicious, the alert processing module 950 does not generate an access control rule authorizing the corresponding communication. In some embodiments, the alert processing module 950 instructs the managed servers 130 to cease communication with the originating actor that initiated the communication triggering the alert. In other words, the originating actor is quarantined. The alert processing module 950 notifies an administrator about the alert in response to classifying the corresponding communication as malicious. Alternatively or additionally, the alert processing module 950 notifies an administrator about the alert regardless of the alert's classification. If the corresponding communication is classified as legitimate, then the alert processing module 950 may instruct the flow processing module 940 to generate an access control rule authorizing the communication. In some embodiments, the alert processing module 950 may request approval for the access control rule from an administrator before adding the access control rule to the set of access control rules 335.

The access control rule (ACR) creation interface 960 provides an administrator an interface for reviewing contextual information, application groups, label sets (e.g., including role labels and/or group-level label sets) assigned to labeled actors (e.g., managed servers 130, labeled devices 150), and access control rules. The ACR creation interface 960 may receive a corrected application group of a labeled actor from an administrator. In response, the actor grouping module 920 updates the labeled actor's application group to match the corrected application group. Additionally, the labeling engine 930 updates the group-level label set of the labeled actor to match the group-level label set of the newly selected application group. The ACR creation interface 960 may receive a corrected label set for a labeled actor, and the labeling engine 930 updates the labeled actor's label set according to the correction. In response to the administrator modifying a labeled actor's group-level label set, the labeling engine 930 modifies group-level label sets of other labeled actors in the application group to match the corrected group-level label set.

The ACR creation interface 960 may receive a target access control rule from an administrator (e.g., by the administrator indicating a particular edge of a displayed graph). For example, the administrator's target access control rule indicates a service, the service's provider, and the service's consumer. The flow processing module 940 generates an access control rule according to the administrator's instructions and possibly generates additional access control rules (or broadens the generated access control rule) based on the service and the label sets of the provider and consumer.

The ACR creation interface 960 may notify the administrator about alerts obtained by the alert processing module 950. The ACR creation interface 960 may receive a classification of the communication triggering the alert, and the flow processing module 940 may generate an access control rule according to the classification. In one embodiment, the ACR creation interface 960 presents an administrator with an access control rule automatically generated by the flow processing module 940. The ACR creation interface 960 may receive the administrator's approval, modification, or denial of the auto-generated access control rule. The flow processing module 940 adds the (possibly modified) auto-generated access control rule to the set of communication rules 335 in response to receiving approval or modification from an administrator.

Generating Access Control Rules

Figure 10:
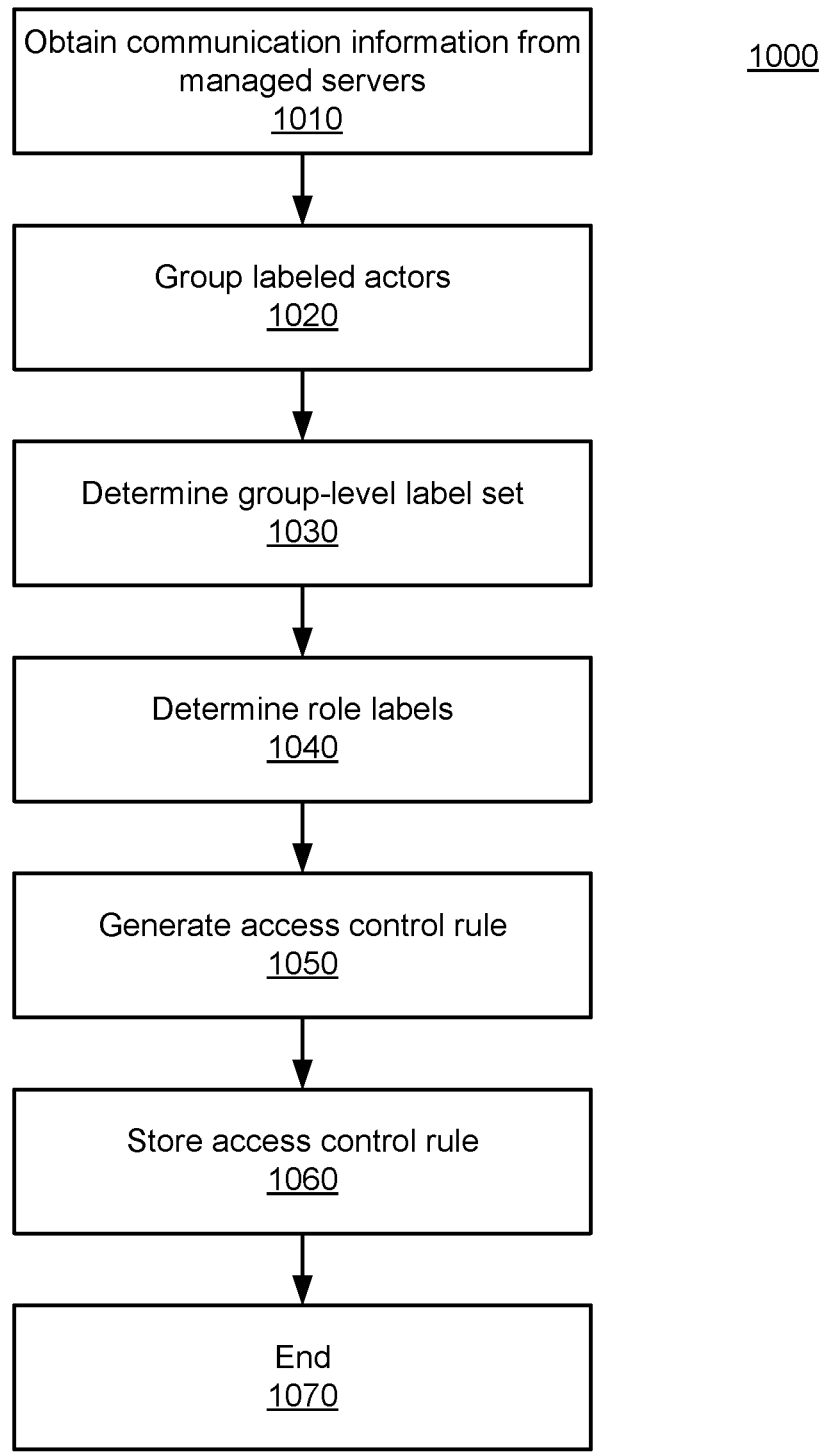
FIG. 10 is a flowchart illustrating a method of generating an access control rule authorizing communication between a plurality of managed servers, according to one embodiment.

FIG. 10 is a flowchart illustrating a method 1000 of generating an access control rule authorizing communication between a plurality of actors (e.g., a managed server 130, an unmanaged device 140, a labeled device 150, a bound service group), according to one embodiment. Other embodiments can perform the steps in different orders and can include different and/or additional steps. In addition, some or all of the steps can be performed by entities other than those shown in FIG. 1.

In step 1010, communication information describing past communication between the plurality of actors is obtained. Typically, the communication information concerns communications sent or received by at least managed server 130. For example, the communication information describes the daily amount of data transferred between each pair of the actors. Step 1010 is performed by, for example, the contextual information collection module 910.

In step 1020, a subset of labeled actors is identified from the plurality of actors by grouping the plurality of actors based on the obtained communication information. For example, the subset is determined by applying a k-means clustering algorithm to a graph with nodes representing the actors and edges having values reflecting daily amount of data transferred between pairs of managed servers 130. Step 1020 is performed by, for example, the actor grouping module 920.

In step 1030, a group-level label set is determined to associate with the subset of labeled actors. For example, the label set includes an application label (e.g., <Application, Human Resources>), a location label (e.g., <Location, North America>), and an environment label (e.g., <Environment, Production>). Step 1030 is performed by, for example, the labeling engine 930.

In step 1040, role labels are determined for labeled actors in the subset of labeled actors. A labeled actor is associated with one role label. For example, a first managed server 130 is associated with a role label having a "Database" value, and a second managed server 130 is associated with a role label having a "Web Server" value based on processes executing on the respective managed servers 130. Step 1040 is performed by, for example, the labeling engine 930.

In step 1050, an access control rule authorizing communication between two labeled actors is generated based on the group-level label set and the role labels. The other labeled actor may be part of the subset of labeled actors or part of another subset of labeled actors. For example, the PB portion of the access control rule indicates that the managed server 130 is the provider of an "sshd" (ssh daemon) service, and the UB portion of the access control rule indicates that the other labeled actor is the consumer of the "sshd" service. Step 1050 is performed by, for example, the flow processing module 940.

In step 1060, the access control rule is stored as part of the set of access control rules 335. Step 1060 is performed by, for example, the flow processing module 940.

In step 1070, the method 1000 ends. Later, the policy engine module 340 processes the change to the administrative domain-wide management policy 330. The processing results in translation of the access control rule to function-level instructions for one or more relevant managed servers 130 to implement the access control rule and sending the function-level instructions to the relevant managed servers 130.

Alternatively or additionally to generating access control rules, the methods described herein may be used to facilitate creation of other rules with different rule functions as part of the administrative domain-wide management policy 330. Some rules specify both the provider of a service and a consumer of a service. One such example rule has a secure connectivity function specifying protocols, encryption, or channels to be used with communications for a service. For these rules, the global manager 120 obtains a target rule and identifies a label set (e.g., including a role label and/or group-level labels) describing the provider and a label set describing the consumer. The global manager 120 then generates additional rules (or broadens existing rules) that apply to provider-consumer pairs with respective label set pairs that match the pair of identified label sets. The additional (or broadened) rules apply to the same service and have the same function profile (e.g., encryption protocol, communication protocol type) as the target rule.

Some rules specify only the provider of the service or only the consumer of the service. Example rules that specify one of a consumer or a provider may have rule functions regulating stored-data encryption, disk usage, peripheral usage, or processor usage. For these rules, the global manager 120 obtains a target rule and identifies a label set corresponding to the provider or the consumer. For rules that specify a provider, the global manager 120 generates additional rules (or broadens existing rules) that apply to providers of the service having label sets that match the identified label set. For rules that specify a consumer, the global manager 120 generates additional rules (or broadens existing rules) that apply to consumers of the service having label sets that match the identified label set. The additional (or broadened) rules apply to the same service and have the same function profile (e.g., encryption protocol, resource usage limits) as the target rule.

Some rules affect a managed server 130 regardless of the services provided by or consumed by the managed server 130. Example rules regulate which processes may execute on a managed server 130, general disk-encryption settings, or when to capture a network packet for security analysis. The global manager 120 obtains a target rule, identifies a label set from the target rule, and generates (or broadens) rules applying to additional managed servers 130 with label sets matching the identified label set. The additional (or broadened) rules have the same function profile as the target rule. This process is similar to that described previously except the generated rule does not specify a service.

In some embodiments, the flow processing module 940 generates rules based on a different class of labels than are used for other rules (e.g., access control rules). Such rules affect a service provided by or used by a managed server 130 and may be generated based on one or more alternative or additional labels for the managed server 130. The labeling engine 930 may determine multiple process-specific role labels to apply to processes of a managed server 130. In one embodiment, the flow processing module 940 generates rules based on alternative role labels for the provider or the consumer of the service. The alternative role labels are the process-specific role labels associated with the one or more processes used by the managed server 130 to provide or consume the service specified by the rule.

Processing Alerts from Managed Servers

Figure 11:
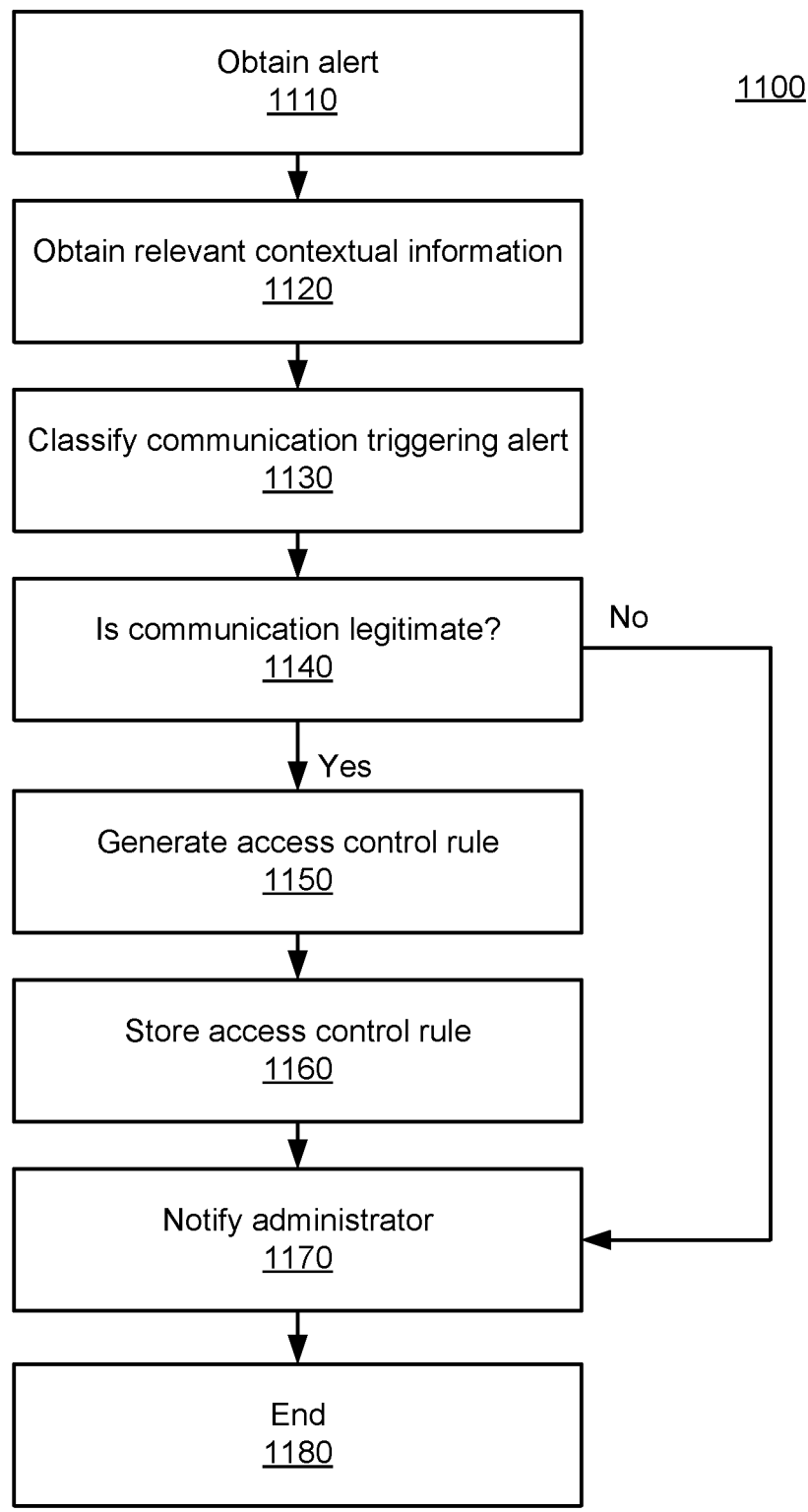
FIG. 11 is a flowchart illustrating a method of processing alerts from managed servers implementing one or more access control rules, according to one embodiment.

FIG. 11 is a flowchart illustrating a method 1100 of processing alerts from managed servers 130 implementing one or more access control rules, according to one embodiment. Other embodiments can perform the steps in different orders and can include different and/or additional steps. In addition, some or all of the steps can be performed by entities other than those shown in FIG. 1.

In step 1110, an alert is obtained from a managed server 130 configured to generate the alert in response to communication with another labeled actor (e.g., managed server 130, bound service group). The alert is generated in response to the managed server 130 determining that the one or more access control rules implemented by the managed server 130 do not authorize the communication between the managed server 130 and the other labeled actor.

In step 1120, contextual information relevant to at least one of the managed server 130, the other labeled actor, and the alert is obtained. For example, the contextual information is administrative domain information indicating the number of ports that a first managed server 130 has requested to connect to at a second managed server 130, where the second managed server 130 does not have any processes listening to the ports. As another example, the contextual information is communication information indicating the frequency of communication between the managed server 130 and the other labeled actor.

In step 1130, the communication corresponding to the alert is classified as being legitimate or malicious. For example, the communication is classified as being malicious in response to the number of ports identified in the administrative domain information exceeding a threshold number of ports. As another example, the communication is classified as being legitimate in response to the frequency of communications not exceeding a threshold difference of an expected frequency of communication associated with the service.

In step 1140, a determination is made whether the communication is classified as legitimate. If the communication is legitimate, the method 1100 proceeds to step 1150. If the communication is not legitimate, the method 1100 proceeds to step 1170.

In step 1150, an access control rule is generated permitting the communication between the managed server 130 and the other labeled actor.

In step 1160, the access control rule is stored as part of a set of access control rules 335.

In step 1170, an administrator is notified about the alert. Notifying an administrator about an alert may include requesting the administrator approve an access control rule generated to authorize the communication corresponding to the alert if the communication is classified as being legitimate. Notifying the administrator may also include prompting the administrator to quarantine the first or second managed server 130 if the communication is classified as malicious.

In step 1180, the method ends. Later, the policy engine module 340 processes the change to the administrative domain-wide management policy 330. The processing results in translating the access control rule to function-level instructions for one or more relevant managed servers 130 to implement the access control rule and sending the function-level instructions to the relevant managed servers 130.

Identifying and Labeling Bound Services

Figure 12:
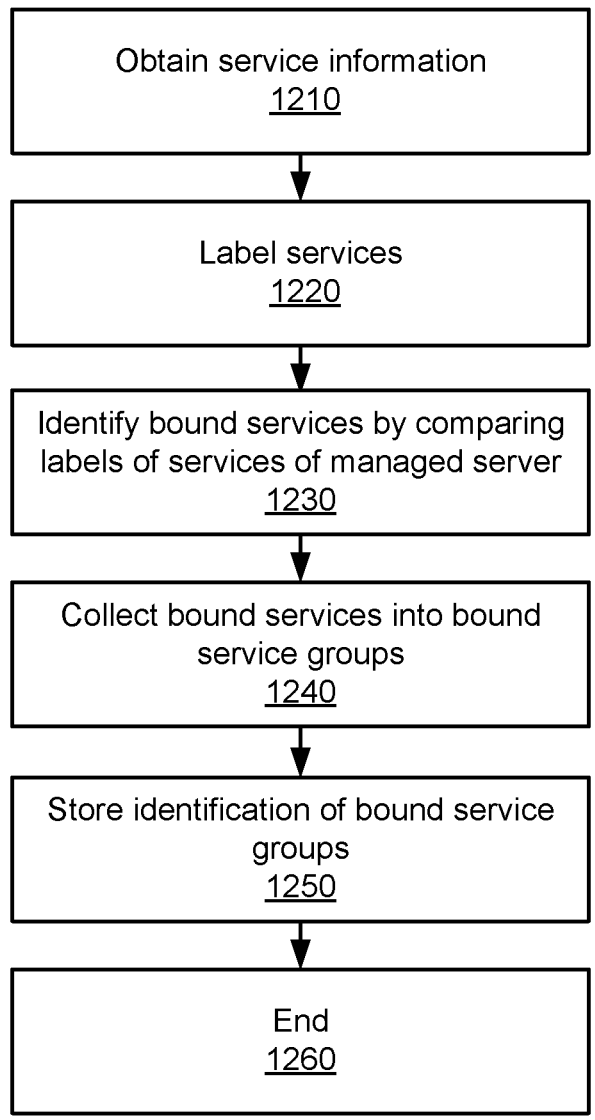
FIG. 12 is a flowchart illustrating a method of identifying and labeling bound service groups on managed servers, according to one embodiment.

FIG. 12 is a flowchart illustrating a method 1200 of identifying and labeling bound service groups on managed servers 130, according to one embodiment. Other embodiments can perform the steps in different orders and can include different and/or additional steps. In addition, some or all of the steps can be performed by entities other than those shown in FIG. 1.

In step 1210, the global manager 120 obtains service information from managed servers 130 in the administrative domain 160. For example, the contextual information collection module 910 obtains the service information.

In step 1220, the global manager 120 applies labels to services based at least in part on the obtained service information. The global manager 120 may obtain the labels according to input received from an administrator or from an analysis of the service information. For example, the labeling engine 930 infers that the value of the "Environment" label for a group of services is "Production" because the services have symmetrical network traffic patterns (e.g., similar volume of data uploaded and downloaded) with external devices. As another example, the labeling engine 930 infers the value of a service's "Role" label from the name of one or more processes associated with the service.

In step 1230, the global manager 120 identifies services as bound services by comparing label sets of services within a managed server 130. For example, the bound service identification module 915 determines a dominant label set for services within a managed server 130, and identifies other services with label sets that differ from the dominant label set as bound services. Independently of services' label sets, the global manager 120 may also identify services as bound services according to the groups of services determined in step 1220. For example, the bound service identification module 915 determines that a service is a bound service because the service is grouped into a different group of services than the majority of other services in a managed server 130.

In step 1240, the global manager 120 groups bound services having matching label sets into bound service groups. For example, the bound service identification module 915 groups the bound services, assigns a UID to the bound service group, and outputs a list associating the bound service group UID with UIDs of services in the bound service group.

In step 1250, the global manager stores the identification (e.g., a list) of bound service groups and bound services within the bound service groups.

In step 1260, the method 1200 ends. Subsequently, the global manager 120 subsequently considers the bound service groups as independent actors from the managed servers 130 providing the bound services when applying rules in the administrative domain 160.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for distributing rules that control communications between managed servers, the method comprising:
obtaining service information for a managed server describing services provided by the managed server;
assigning respective label sets to the services provided by the managed server based on the obtained service information;
determining a dominant label set for the services that is assigned to a majority of the services provided by the managed server;
assigning the dominant label set to the managed server;
identifying a group of bound services of the set of services that have a differing label set from the dominant label set;
obtaining a policy comprising a plurality of rules for controlling the communications between the managed servers;
identifying a first rule of the plurality of rules for controlling communications to or from managed servers having the dominant label set;
identifying a second rule of the plurality of rules for controlling communications associated with services having the differing label set; and
distributing instructions to the managed server to enable the managed server to enforce the first rule and the second rule.

2. The method of claim 1, wherein distributing the instructions comprises:
generating a first function-level instruction for implementing the first rule;
generating a second function-level instruction for implementing the second rule; and
sending the first functional-level instruction and the second function-level instruction to the managed server.

3. The method of claim 1, wherein identifying the group of bound services further comprises:
assigning a group identifier to the group of bound services; and
storing an association between the group identifier and each of the group of bound services.

4. The method of claim 1, wherein the managed server provides services in a plurality of different bound service groups.

5. The method of claim 1, wherein the label set comprises a multi-dimensional set of labels.

6. The method of claim 1, wherein assigning the respective label sets comprises automatically generating the label sets.

7. The method of claim 1, wherein assigning the respective label sets comprises:
assigning a role label based on one or more processes associated with the services.

8. A non-transitory computer-readable storage medium storing instructions executable by one or more processors to perform steps for distributing rules that control communications between managed servers, the steps comprising:
obtaining service information for a managed server describing services provided by the managed server;
assigning respective label sets to the services provided by the managed server based on the obtained service information;
determining a dominant label set for the services that is assigned to a majority of the services provided by the managed server;
assigning the dominant label set to the managed server;
identifying a group of bound services of the set of services that have a differing label set from the dominant label set;
obtaining a policy comprising a plurality of rules for controlling the communications between the managed servers;

identifying a first rule of the plurality of rules for controlling communications to or from managed servers having the dominant label set;

identifying a second rule of the plurality of rules for controlling communications associated with services having the differing label set; and distributing instructions to the managed server to enable the managed server to enforce the first rule and the second rule.

9. The non-transitory computer-readable storage medium of claim 8, wherein distributing the instructions comprises:

generating a first function-level instruction for implementing the first rule;

generating a second function-level instruction for implementing the second rule; and sending the first functional-level instruction and the second function-level instruction to the managed server.

10. The non-transitory computer-readable storage medium of claim 8, wherein identifying the group of bound services further comprises:

assigning a group identifier to the group of bound services; and storing an association between the group identifier and each of the group of bound services.

11. The non-transitory computer-readable storage medium of claim 8, wherein the managed server provides services in a plurality of different bound service groups.

12. The non-transitory computer-readable storage medium of claim 8, wherein the label set comprises a multi-dimensional set of labels.

13. The non-transitory computer-readable storage medium of claim 8, wherein assigning the respective label sets comprises automatically generating the label sets.

14. The non-transitory computer-readable storage medium of claim 8, wherein assigning the respective label sets comprises:

assigning a role label based on one or more processes associated with the services.

15. A computer system comprising:

one or more processors; and a non-transitory computer-readable storage medium storing instructions executable by the one or more processors to perform steps for distributing rules that control communications between managed servers, the steps comprising:

obtaining service information for a managed server describing services provided by the managed server;

assigning respective label sets to the services provided by the managed server based on the obtained service information;

determining a dominant label set for the services that is assigned to a majority of the services provided by the managed server;

assigning the dominant label set to the managed server;

identifying a group of bound services of the set of services that have a differing label set from the dominant label set;

obtaining a policy comprising a plurality of rules for controlling the communications between the managed servers;

identifying a first rule of the plurality of rules for controlling communications to or from managed servers having the dominant label set;

identifying a second rule of the plurality of rules for controlling communications associated with services having the differing label set; and distributing instructions to the managed server to enable the managed server to enforce the first rule and the second rule.

16. The computer system of claim 15, wherein distributing the instructions comprises:

generating a first function-level instruction for implementing the first rule;

generating a second function-level instruction for implementing the second rule; and sending the first functional-level instruction and the second function-level instruction to the managed server.

17. The computer system of claim 15, wherein identifying the group of bound services further comprises:

assigning a group identifier to the group of bound services; and storing an association between the group identifier and each of the group of bound services.

18. The computer system of claim 15, wherein the managed server provides services in a plurality of different bound service groups.

19. The computer system of claim 15, wherein the label set comprises a multi-dimensional set of labels.

20. The computer system of claim 15, wherein assigning the respective label sets comprises automatically generating the label sets.

* * * * *